United States Patent [19]

Jones et al.

[11] Patent Number: 5,309,409
[45] Date of Patent: May 3, 1994

[54] TARGET DETECTION SYSTEM

[75] Inventors: Charles H. Jones, Pasadena; John H. Thompson; John W. Kesner, both of Severna Park, all of Md.

[73] Assignee: Westinghouse Electric Corp., Pittsburgh, Pa.

[21] Appl. No.: 437,372

[22] Filed: Oct. 28, 1982

[51] Int. Cl.$^5$ ............................................. G01S 15/00
[52] U.S. Cl. .................................. 367/103; 367/118; 367/123; 367/126
[58] Field of Search ................ 367/103, 118, 123, 126, 367/905; 343/16 R, 380, 383; 342/368

[56] References Cited

U.S. PATENT DOCUMENTS 4,060,792  11/1977  van Heyningen ............. 367/905 X

*Primary Examiner*—Daniel T. Pihulic
*Attorney, Agent, or Firm*—D. Schron

[57] ABSTRACT

An array of transducer elements receives energy from a target or targets in a field of view and operates on the transducer outputs to provide a plurality of different levels of shading. The most useful portion of the field pattern is selected and combined with other most useful portions of other field patterns into a single composite display which results in one or more relatively narrow lobes, indicating targets, and without the presentation of side lobes which may be masking targets.

12 Claims, 20 Drawing Sheets

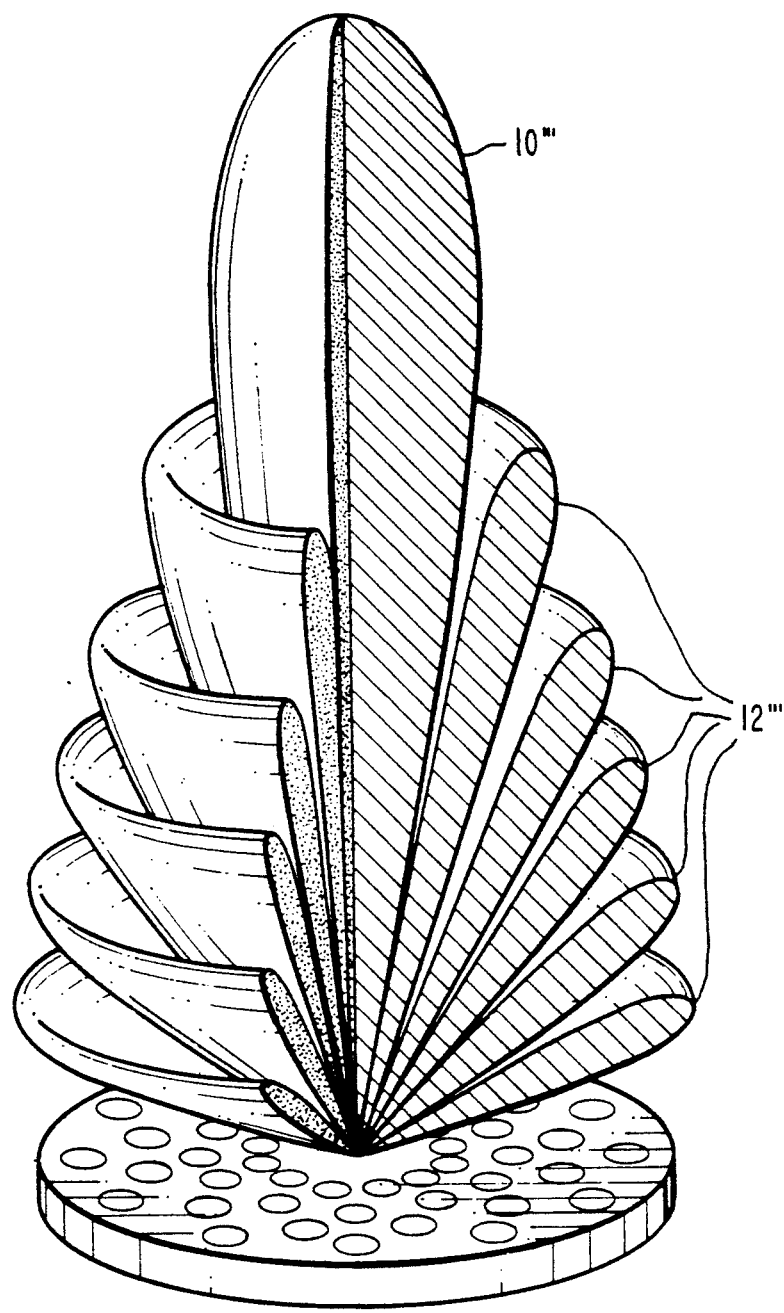
FIG. ID

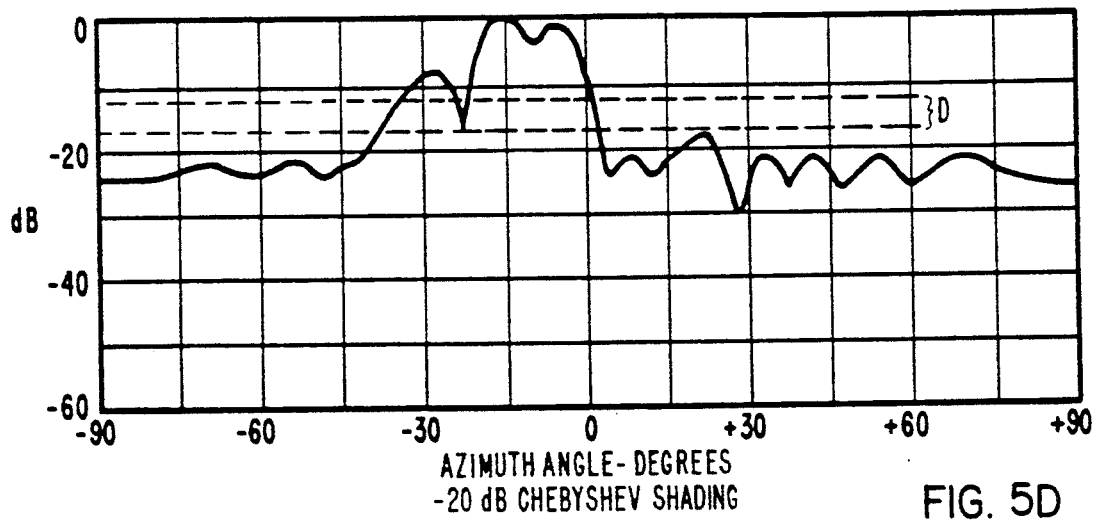
FIG. 5D — AZIMUTH ANGLE-DEGREES
−20 dB CHEBYSHEV SHADING
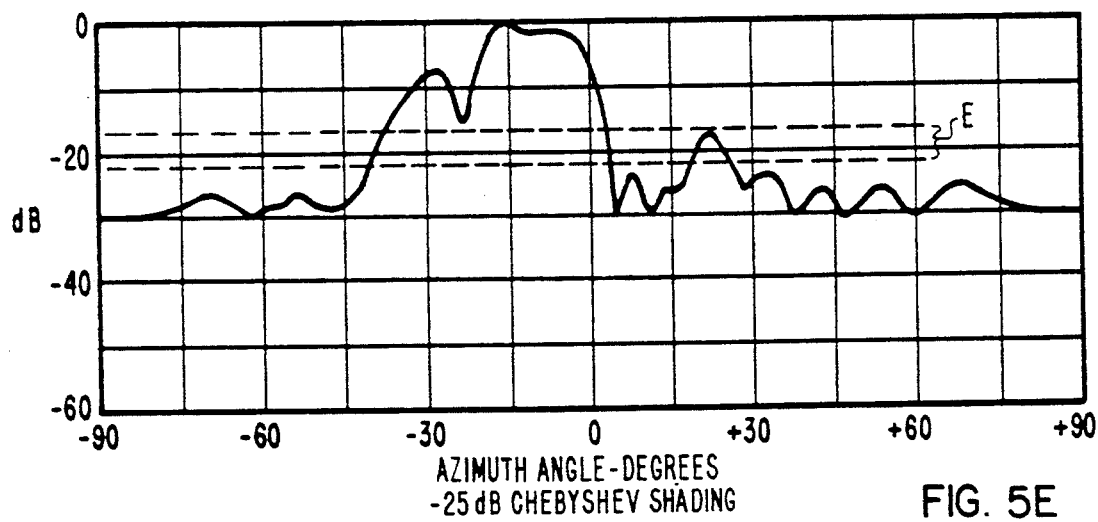
FIG. 5E — AZIMUTH ANGLE-DEGREES
−25 dB CHEBYSHEV SHADING
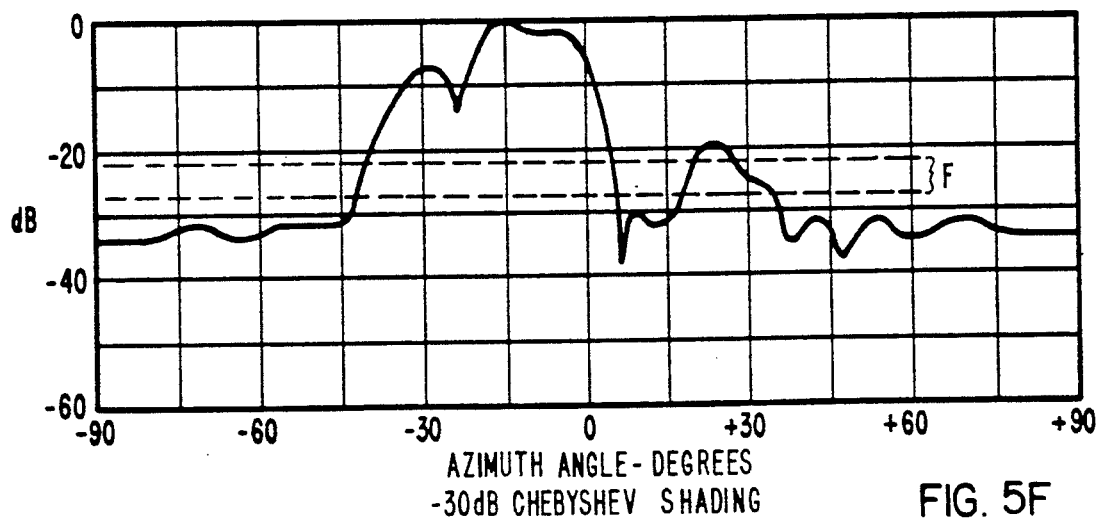
FIG. 5F — AZIMUTH ANGLE-DEGREES
−30 dB CHEBYSHEV SHADING

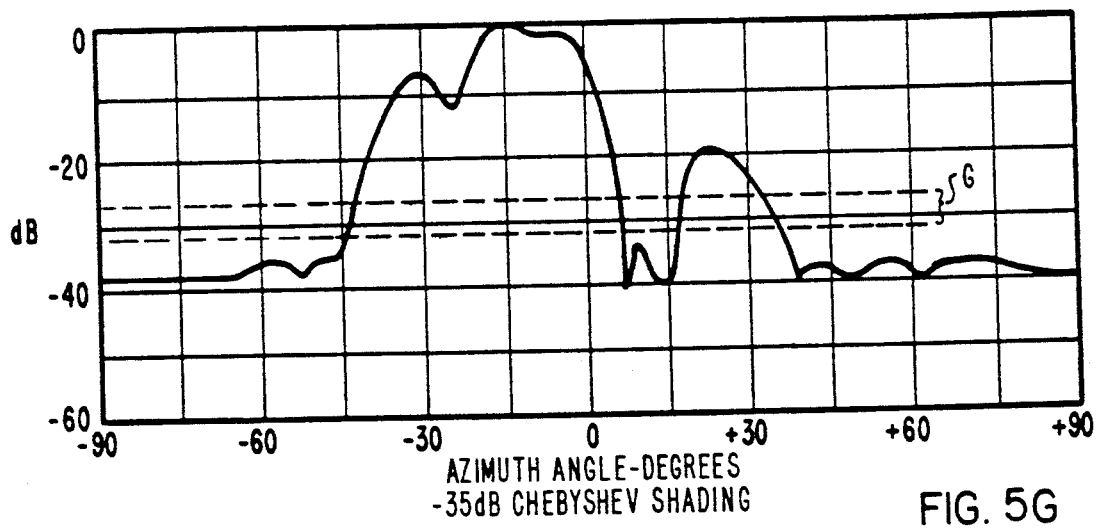
FIG. 5G — AZIMUTH ANGLE-DEGREES -35dB CHEBYSHEV SHADING
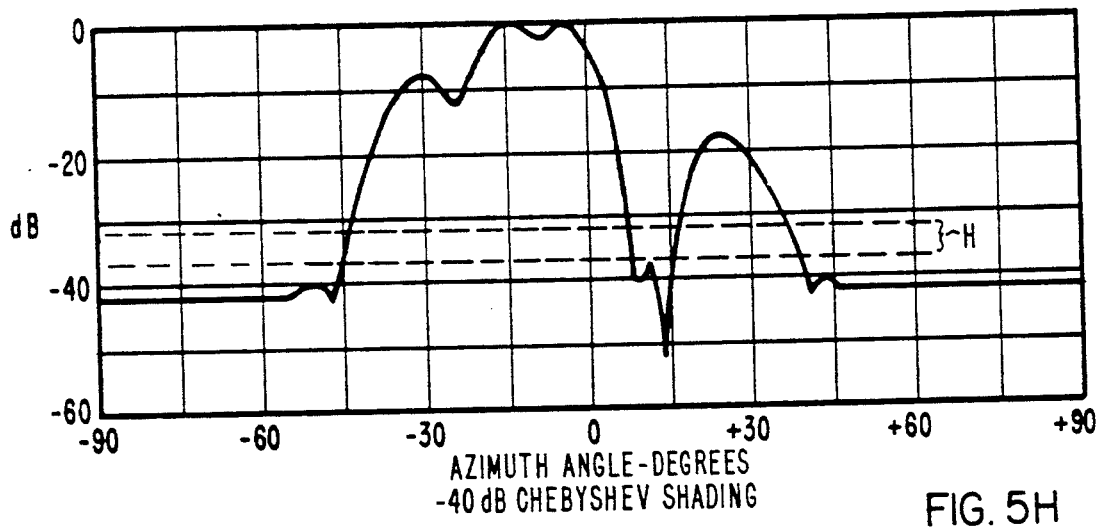
FIG. 5H — AZIMUTH ANGLE-DEGREES -40dB CHEBYSHEV SHADING
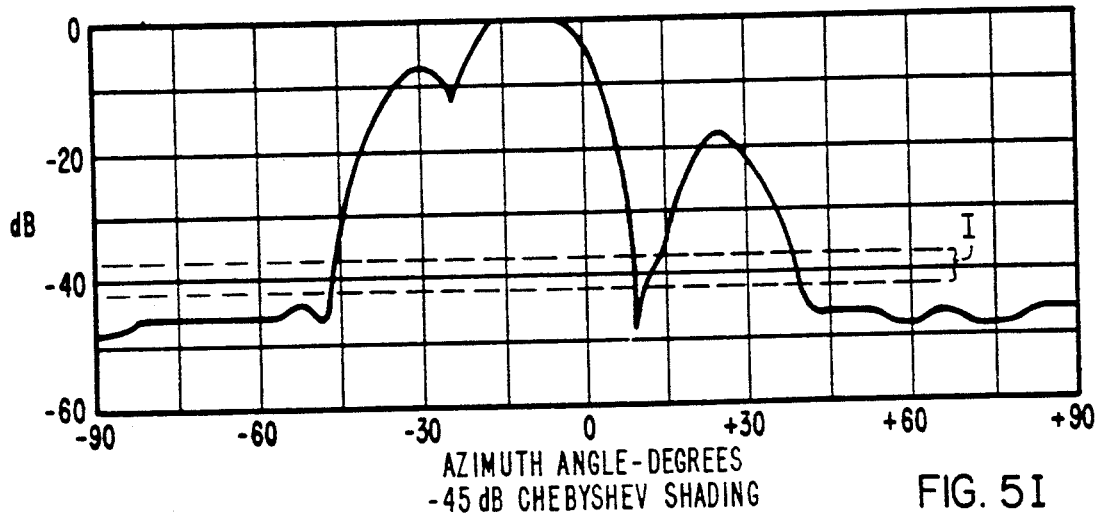
FIG. 5I — AZIMUTH ANGLE-DEGREES -45dB CHEBYSHEV SHADING

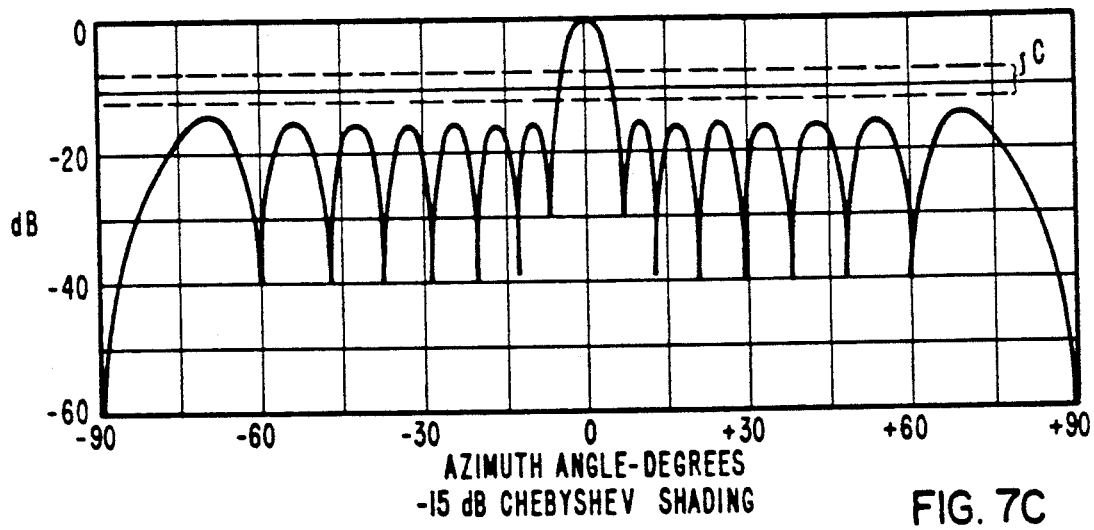
FIG. 7C -15 dB CHEBYSHEV SHADING
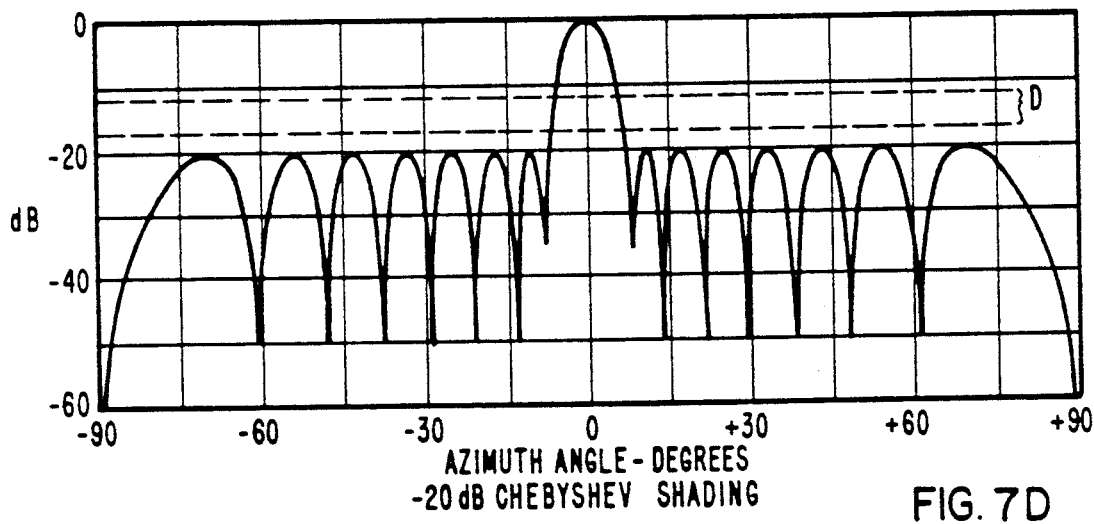
FIG. 7D -20 dB CHEBYSHEV SHADING
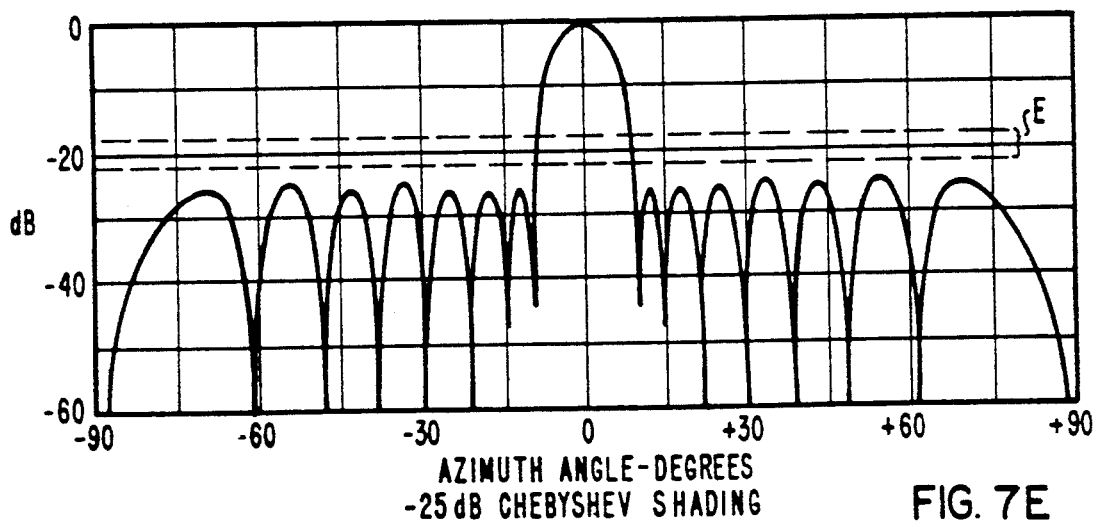
FIG. 7E -25 dB CHEBYSHEV SHADING

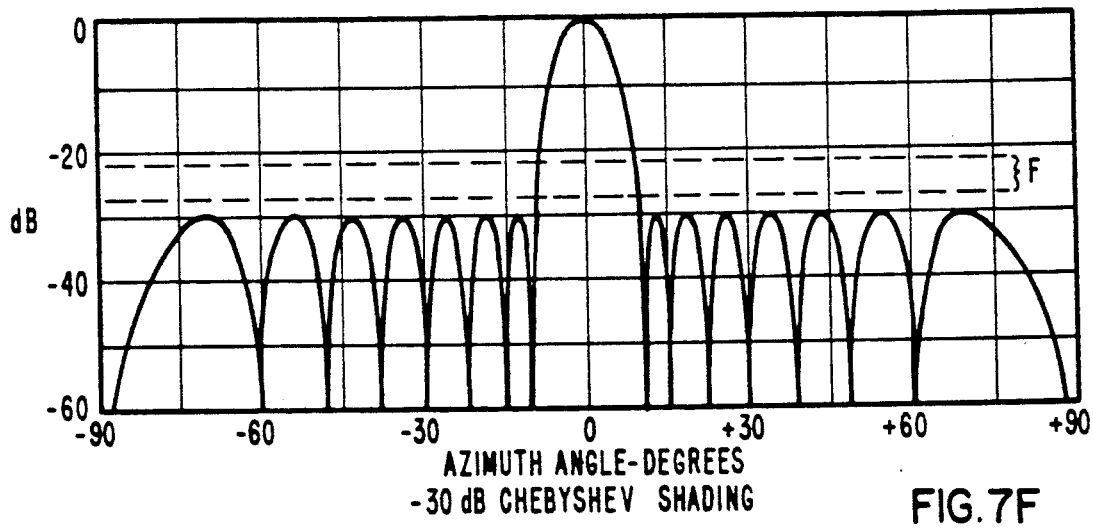
FIG. 7F — -30 dB CHEBYSHEV SHADING
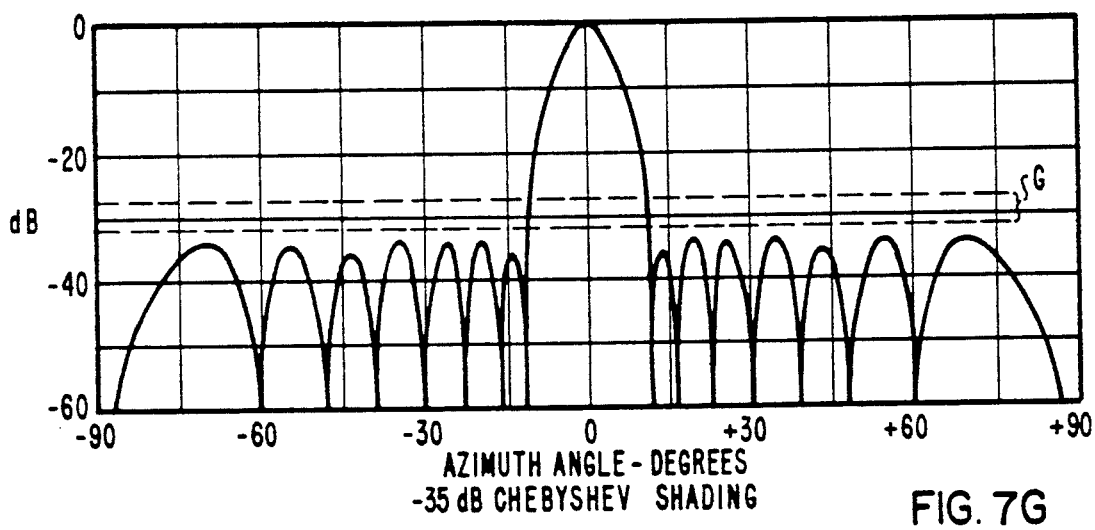
FIG. 7G — -35 dB CHEBYSHEV SHADING
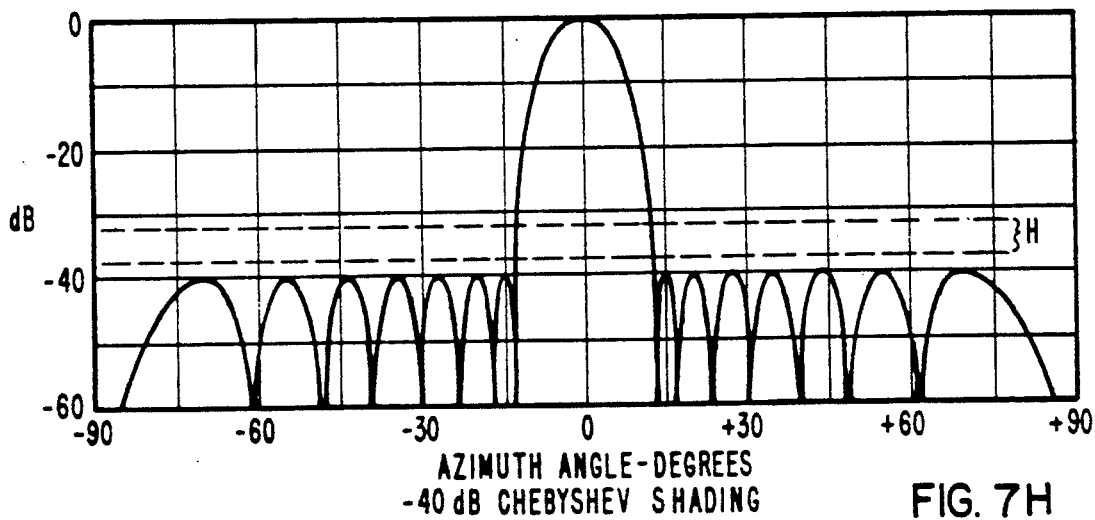
FIG. 7H — -40 dB CHEBYSHEV SHADING -45 dB CHEBYSHEV SHADING -50 dB CHEBYSHEV SHADING -55 dB CHEBYSHEV SHADING

TARGET DETECTION SYSTEM

BACKGROUND OF THE INVENTION

1. Field of the Invention

The invention in general relates to sonar or radar systems for detecting targets, and more particularly to an improved signal processing technique to enable better resolution and better detection of weak target signals.

2. Description of the Prior Art

In an energy detection system operative either in an active or receive only mode, an array of transducer elements is generally utilized in conjunction with signal processing apparatus for forming one or more receiver beams so as to detect possible targets in an area under observation.

The beam shape may be modified by a technique known as shading. However a trade-off situation is encountered whereby an improvement in angular resolution of the main beam results in the generation of higher side lobes which may actually mask weak target signals.

SUMMARY OF THE INVENTION

The present invention obviates the shortcomings of prior art systems by providing an array of transducer elements each operable to provide an output signal in response to energy received from a target area under observation. The energy may be acoustic or electromagnetic in nature. Beamformer circuit means is included and is operable in response to all of the output signals of the transducer elements to shade or weight the output signals so as to provide a plurality of different field pattern signals. Circuit means are provided for selecting different predetermined portions from the plurality of field pattern signals and combining the portions into one unitary composite field pattern signal which exhibits extremely high angular resolution with extremely low side lobe levels.

BRIEF DESCRIPTION OF THE DRAWINGS

FIGS. 1A-1D illustrate various beam patterns;

FIGS. 5A-5M and 6 and 6A are field patterns illustrating the operation of the embodiment of FIG. 3 with multiple targets;

FIGS. 7A-7M and 8 and 8A are field patterns illustrating the operation of the embodiment of FIG. 3, with a single target;

BRIEF DESCRIPTION OF THE PREFERRED EMBODIMENT

Figures 1A, 1B, 1C:
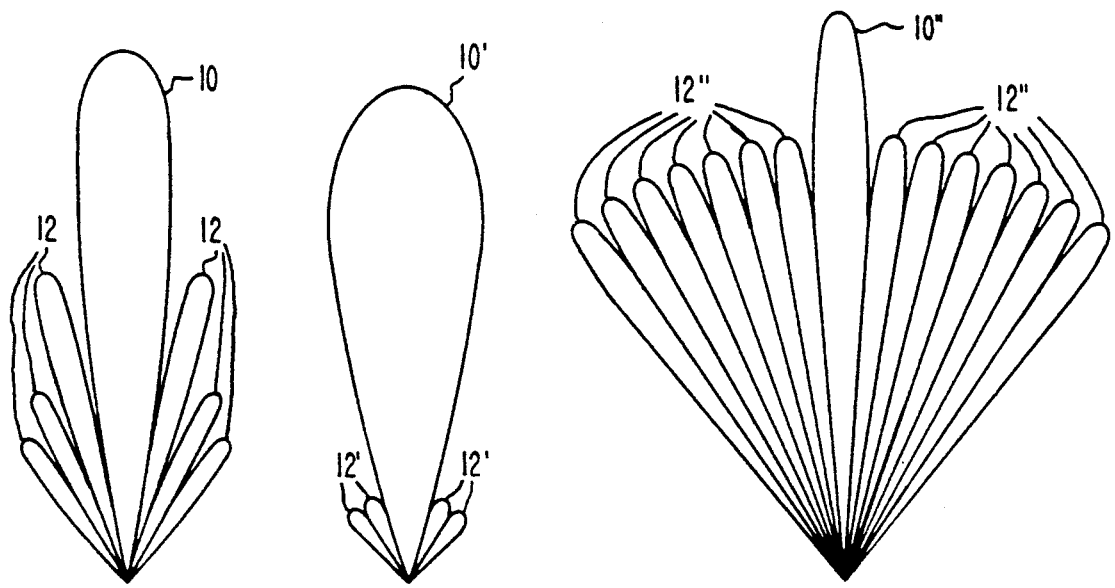

FIG. 1A illustrates a polar plot of a typical beam pattern of a transducer array. It is seen that the beam includes a main lobe 10 and a plurality of side lobes 12. From a target detection standpoint the presence of large side lobes is undesirable since they can lead to an ambiguity with respect to actual targets. For precise target detection the main lobe should be extremely narrow with no side lobes at all. This represents the ideal pattern which, however, cannot be attained. In an effort to shape the beam for better detection of targets a technique known as shading is utilized to modify the amplitude of the signals of the transducer elements of the array.

A trade-off situation exists, however, in that when shading is applied to greatly reduce the side lobe level, as illustrated by side lobes 12' in FIG. 1B, the width of the main lobe 10' significantly increases resulting in a loss of gain and loss of angular resolution for target detection. If on the other hand, and as illustrated in FIG. 1C, a particular shading is utilized to narrow the main lobe 10'', the gain and resolution will improve but the amplitude and number of side lobes 12'' will significantly increase.

It is to be noted that FIGS. 1A-1C illustrate an energy distribution in one particular plane and as might be related to a transducer line array. If the transducers are arranged in a two dimensional array a three dimensional beam pattern will result. A typical beam pattern for a circular array of transducers is illustrated in FIG. 1D wherein the main lobe 10''' and side lobes 12''' are illustrated partially in section.

Figure 2:
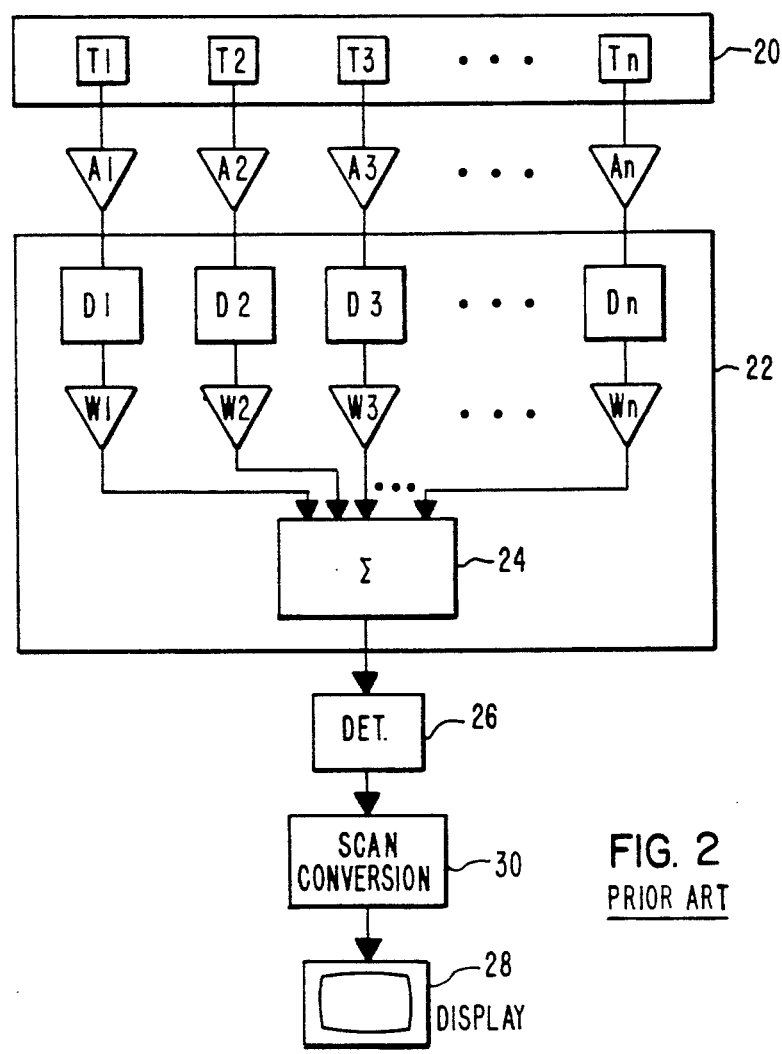
FIG. 2 is a block diagram of a typical sonar detection system utilizing a beamformer.

Although the present invention is applicable to both sonar and radar systems, it will be described by way of example with respect to a sonar system, a typical prior art example of which is illustrated in FIG. 2. An array 20 of n transducers designated T1 to Tn is positioned for receiving acoustic energy from a target area under observation, the acoustic energy being the result of either target generated acoustic energy or energy that has been projected toward and reflected back from the target area under investigation.

In response to the received acoustic energy each of the individual transducer elements provides an output signal which is amplified by respective amplifiers A1 to An. The transducer signals are then provided to a beamformer 22 operable to derive a field pattern, or signal level as a function of angle. The beamformer can obtain the response from any direction by virtue of the plurality of delay units D1 to Dn which may take the form of delay lines, shift registers or charge coupled devices, by way of example.

A desired weighting function may be applied by the beamformer with the provision of weighting amplifiers W1 to Wn each operable to impart a predetermined weighting factor or value to the individual transducer output signal in accordance with the particular weighting function implemented. Typical amplitude shading functions which may be utilized include, but are not limited to the following: Dolph-Chebyshev (Chebyshev); binomial; truncated Gaussian; Taylor; cosine and trapezoidal.

All of the weighted transducer signals are then supplied to a summer 24 the output signal of which is amplitude detected by means of detector 26 for presentation on a display as an intensity versus beam angle presentation, for example. If the display 28 is a conventional cathode ray tube (CRT) television monitor, a scan converter 30 is provided for the storage of the detector output so as to be compatible with the scanning frequencies of the tv monitor.

Basically the level of the weighting function chosen determines the level or amplitude of the side lobes and this level may be selected by proper choice of amplifiers W1 to Wn. As previously pointed out however if the weighting function level is chosen so as to significantly reduce the side lobes, the resolution of the detection system will be significantly degraded. Conversely, if the weighting level is chosen so as to provide for better angular resolution, the side lobe levels increase so as to mask the presence of weak targets while the better angular resolution makes it possible to distinguish two or more targets that are close together.

Basically, the present invention provides for an improved target detection system by utilizing a plurality of different levels of shading function and combining the resultant signals so as to generate a better image than is possible with any single shading function.

Figure 3:
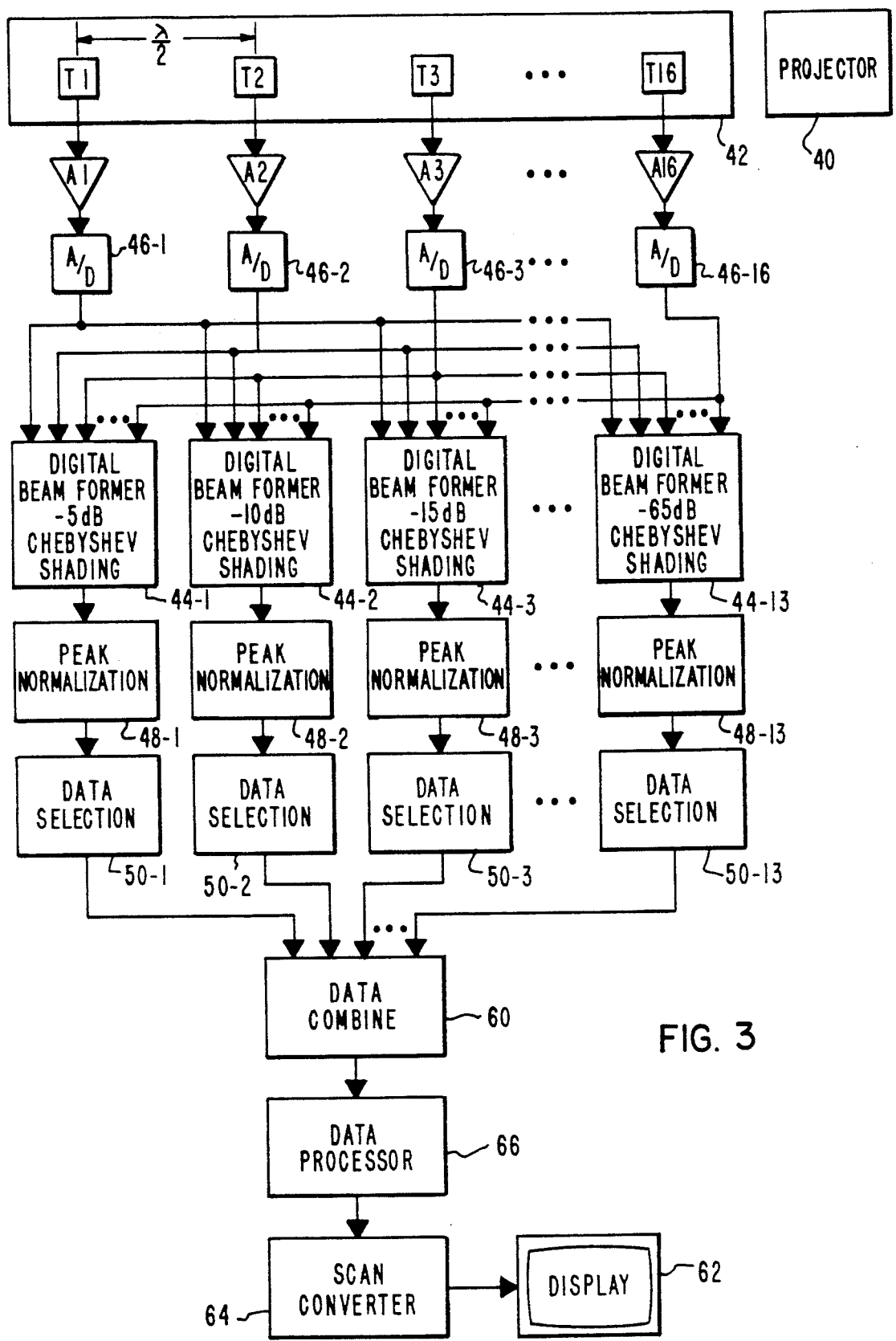
FIG. 3 is a block diagram illustrating one embodiment of the present invention.

Although the technique is applicable to line arrays, planar arrays and conformal arrays, it will be described by way of example with respect to a line array of 16 transducers T1 to T16 each separated by half wavelength ($\lambda/2$), as illustrated in FIG. 3.

An active sonar system is illustrated and includes a projector 40 for transmitting acoustic energy through the water medium toward a target area under observation. Reflected acoustic signals from the target area are picked up by the array 42 of transducers T1 to T16, the individual output signals of which are amplified in respective amplifiers A1 to A16.

With the proliferation of the use of computers and microcomputers in the signal processing field, many modern day beamformers are of the digital signal processing variety. These are used in the arrangement of FIG. 3 which includes 13 digital beamformers 44-1 to 44-13 each operable to generate a different field pattern signal of intensity versus beam angle by applying different levels of weighting function to the transducer output signals after their amplification and conversion to digital form by respective analog-to-digital converters 46-1 to 46-16.

Each of the beamformers applies by way of example a Chebyshev shading with beamformer 44-1 applying a first level of −5 dB Chebyshev shading, beamformer 44-2 applying a second level of −10 dB Chebyshev shading and with successive beamformers applying successively lower levels of shading function. The example of FIG. 3 illustrates 13 different levels starting with −5 dB and decreasing by −5 db with each subsequent beamformer. It is understood that various different levels of shading functions may be utilized as well as different shading functions themselves for the various beamformers, the number and type being dependent upon the expected noise level with additional consideration being given to the array geometry and the type of target to be detected.

For the different levels of Chebyshev shading illustrated, the respective digital beamformers will apply certain weighting values to the transducer output signals. The odd and even levels of shading are respectively illustrated in FIGS. 4A and 4B wherein the transducer number is plotted on the horizontal axis and relative normalized weighting value, in arbitrary units, is plotted on the vertical axis.

Figure 4A:
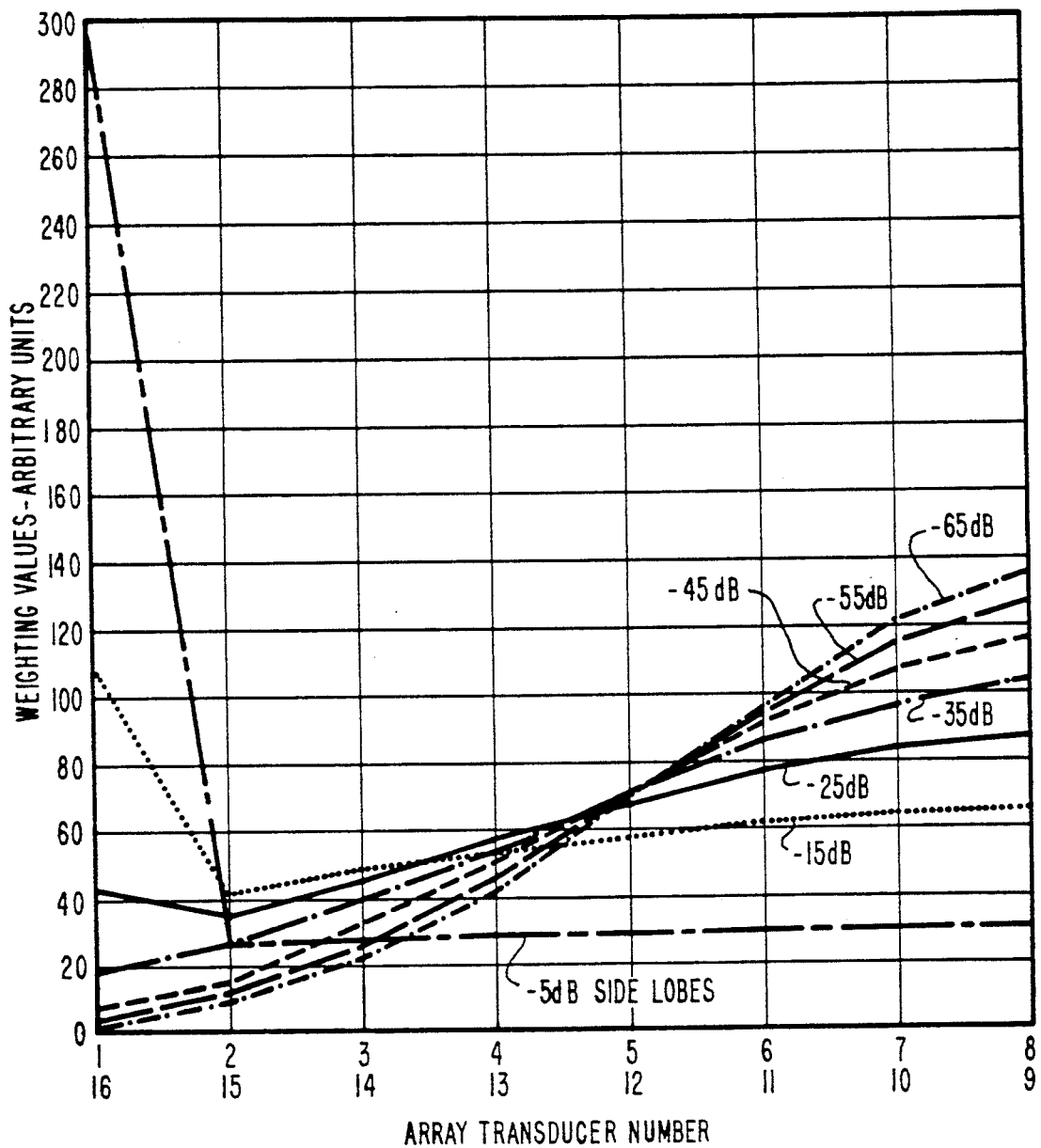
FIGS. 4A and 4B are charts illustrating certain weighting values to be applied to transducer elements of an array.
Figure 4B:
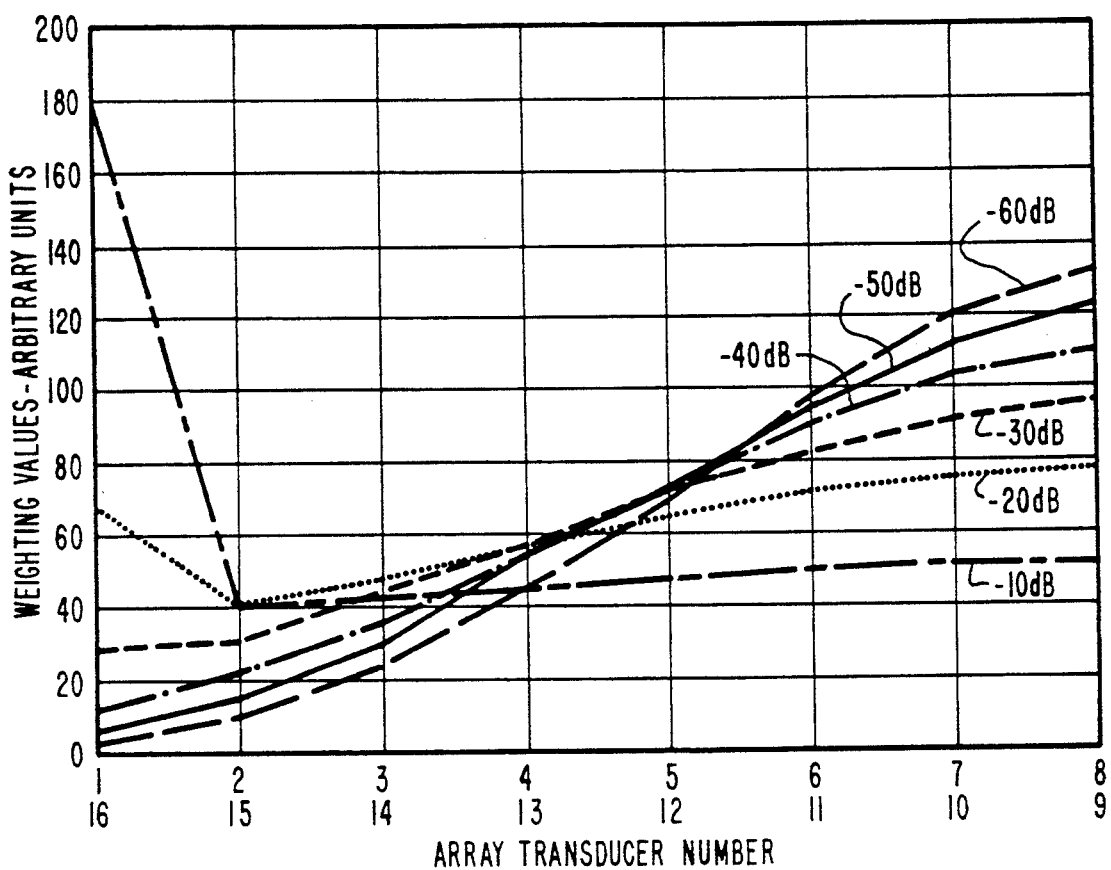

The curves of FIGS. 4A and 4B are symmetrical about the center of the array such that the end transducers T1 and T16 receive the same weighting values as do transducers T2 and T15, transducers T3 and T14, etc. Thus beamformer 44-1 applies to the 16 transducer outputs weighting values as dictated by the curve labeled −5 dB (FIG. 4A). Beamformer 44-2 will apply to these same transducer outputs the weighting values as dictated by the curve labeled −10 dB (FIG. 4B). In a similar fashion the subsequent beamformers apply the weighting values as indicated by the particular curve corresponding to the particular level of shading function utilized.

Referring back to FIG. 3, the outputs of the beamformers are peak normalized in respective peak normalization circuits 48-1 to 48-13 to yield a plurality of different field pattern signals relating intensity to beam angle (azimuth), each being generated as a result of the application of a different level of shading function.

Since shading for higher side lobes (−5 dB shading) gives better resolution but allows weak targets in the side lobes to go undetected, and since shading for the lower side lobes (−65 dB shading) reduces the side lobes but results in loss of angular resolution, the present arrangement takes the most useful information from each of the generated patterns and combines them into one composite display which exhibits good angular resolution with relatively low or no side lobes, representing an optimum condition that cannot be obtained utilizing a single shading function.

Accordingly, data selection means 50-1 to 50-13 are provided to just take predetermined different incremental portions of the signal provided by the respective peak normalization circuits 48-1 to 48-13. By way of example, each data selection circuit may examine all of the values of the input signal and select only those values which fall between the limits of ($S_L+I$) and ($S_L+I+\Delta$) where $S_L$ is the side lobe shading level (−5 dB, −10 dB, −15 dB etc.), $\Delta$ is a predetermined increment of 5 dB and I is an increment of a value such that the swath of width $\Delta$ falls just above the anticipated side lobe levels. By way of example, I is +3dB although if the expected targets are few in number I may be less than +3dB whereas for many expected targets it may be desirable to make I greater than +3dB. Thus data selection circuit 50-1 will pass only those values of the field pattern signal which lie between +3 and −2 dB. Data selection circuit 50-2 will pass all those values which lie between −2 dB and −7 dB. Subsequent data selection circuits will pass data lying within subsequent increments of 5 dB, as will be described.

The various incremental portions of the field pattern signals passed by the data selection circuits 50-1 to 50-13 are combined into one unitary composite field pattern signal in circuit 60 for presentation on display 62 after scan conversion by means of scan converter 64. The information may also, if desired, be entered into a fire control, or other type of computer.

The composite picture presented on the display is made up of individual segments from different field pattern signals and accordingly, as will be seen, may be somewhat disjointed. This presentation however will not detract from the information conveyed by the display. If desired, the segments may be joined so that a continuous line display may be presented for aesthetic reasons and to accomplish this joining operation a data processor 66 may be provided for display enhancement.

Figure 5:
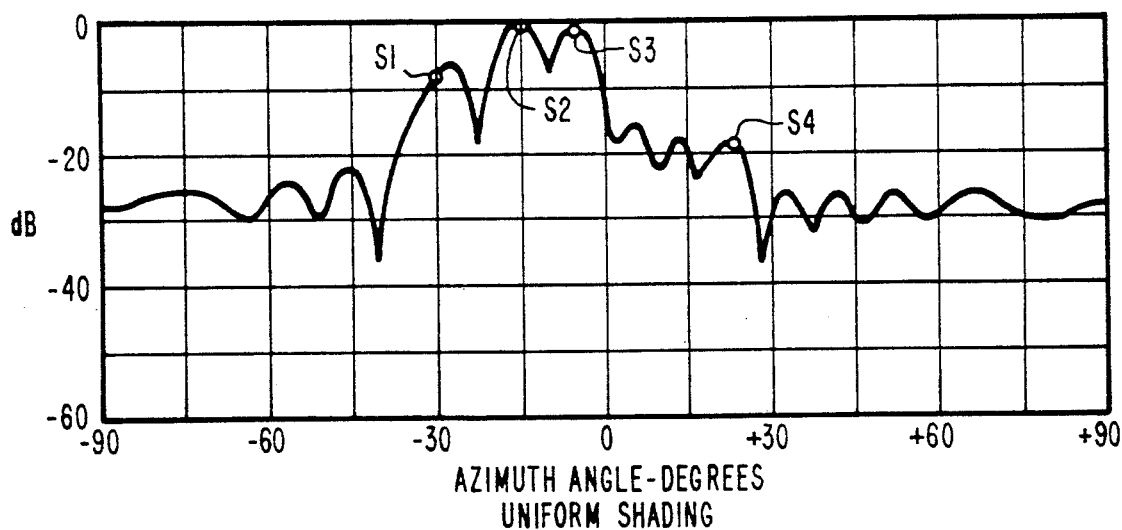
FIG. 5 is a field pattern obtained by a uniformly shaded line array in response to multiple targets.

The operation of the apparatus of FIG. 3 will now be explained with additional reference to FIGS. 5-6A. FIG. 5 illustrates a typical field pattern generated in the presence of four targets or point sound sources S1 to S4 and without the use of any shading, or with the use of uniform shading. Normalized intensity in decibels is plotted on the vertical axis and azimuth angle in degrees is plotted on the horizontal axis. The targets are superimposed on the field pattern at their respective locations relative to the transducer array and at respective intensity levels as may be produced by different target sizes, materials, etc. It is seen that without the use of shading, the three targets S1, S2 and S3 are detected as evidenced by the waveform peaks in these vicinities, however the weaker target signal S4 is lost in the side lobe structure. That is, an operator cannot tell whether the peak at +25 degrees is a normal side lobe or an actual target.

Figure 5A:
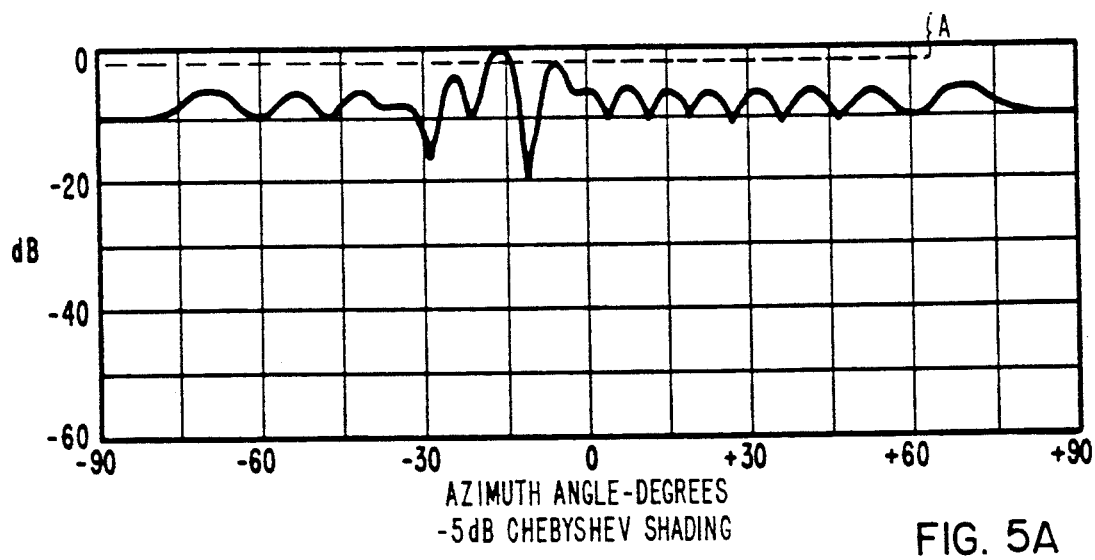

With the present invention the side lobes are reduced without degraded angular resolution so as to provide for positive target identification. The process for accomplishing this is detailed in FIGS. 5A to 6A. FIG. 5A illustrates the field pattern generated by the apparatus in response to the four targets S1 to S4, with the application of −5 dB Chebyshev shading by beamformer 44-1.

The data selection circuit 50-1 examines the field pattern of FIG. 5A, as outputted by peak normalization circuit 48-1 and selects only that portion of the waveform from +3dB to −2 dB. The portion selected is indicated by letter A. The waveform of FIG. 5A improves the resolution of strong targets but has such high side lobe levels as to completely mask the weak target.

Figure 5B:
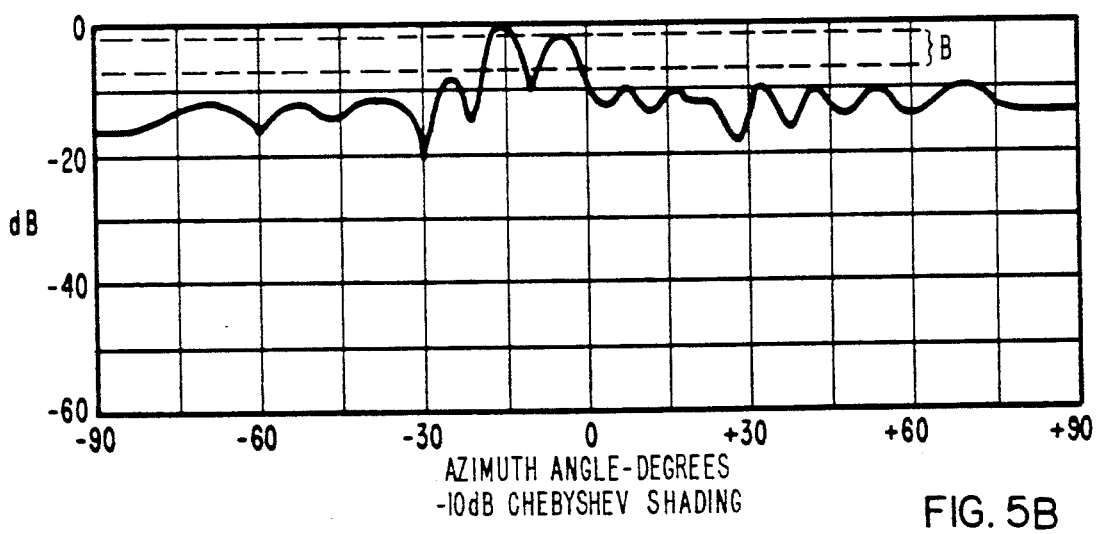

In FIG. 5B, the output of peak normalization circuit 48-2, the side lobes are reduced somewhat and data selection circuit 50-2 selects only that portion of the waveform which falls between the −2 dB and −7 dB levels, this portion being indicated by the letter B.

Figure 5C:
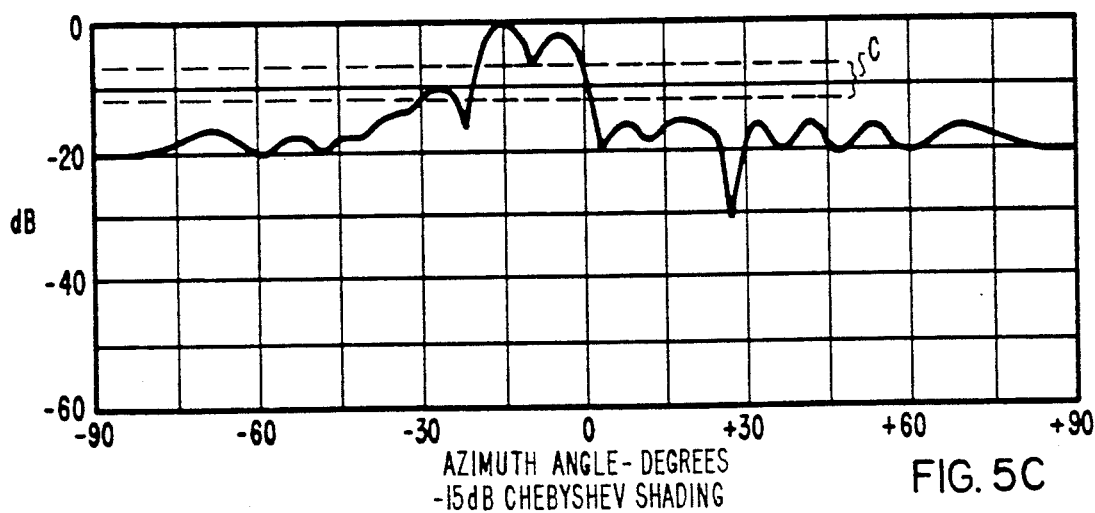
Figure 5J:
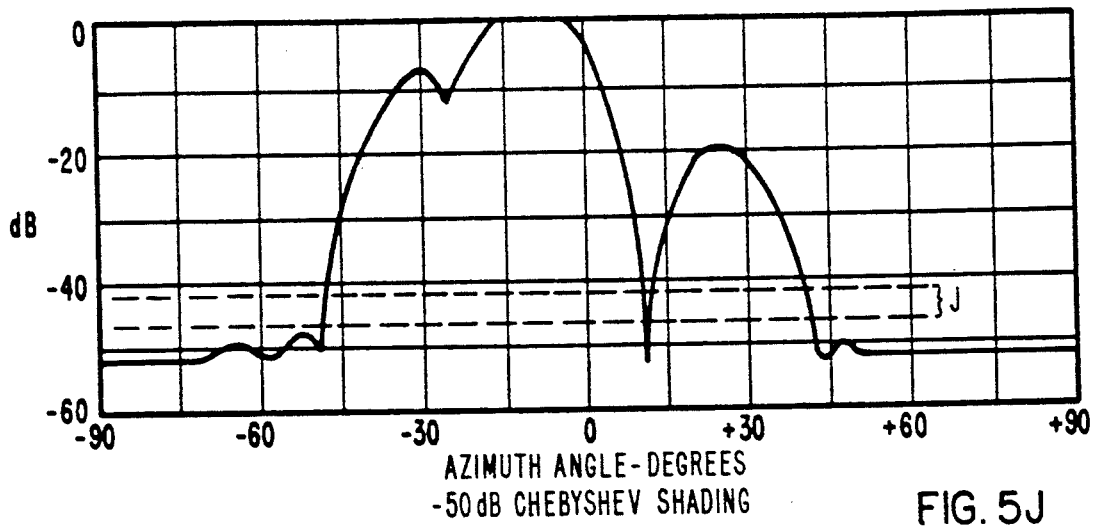
Figure 5K:
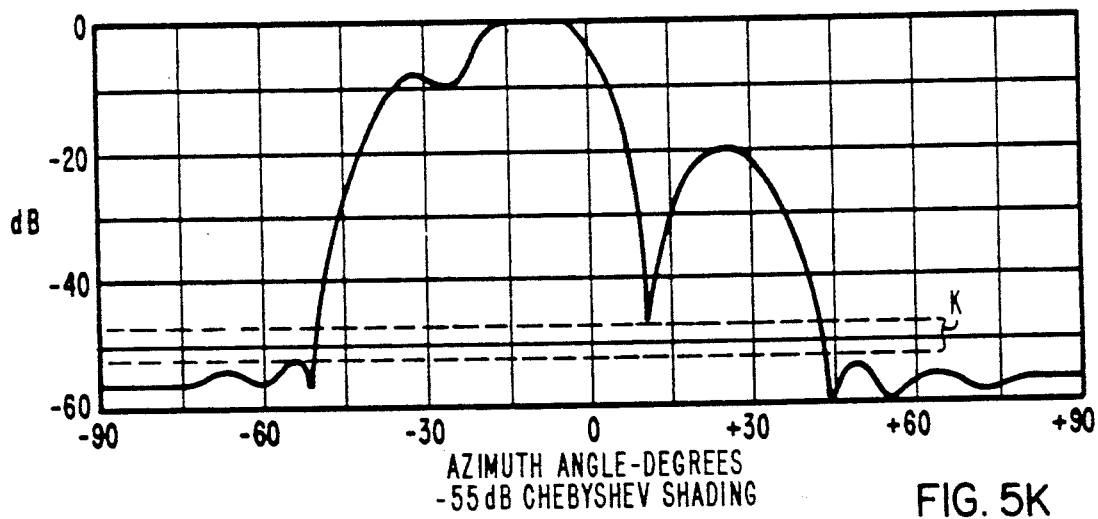
Figure 5L:
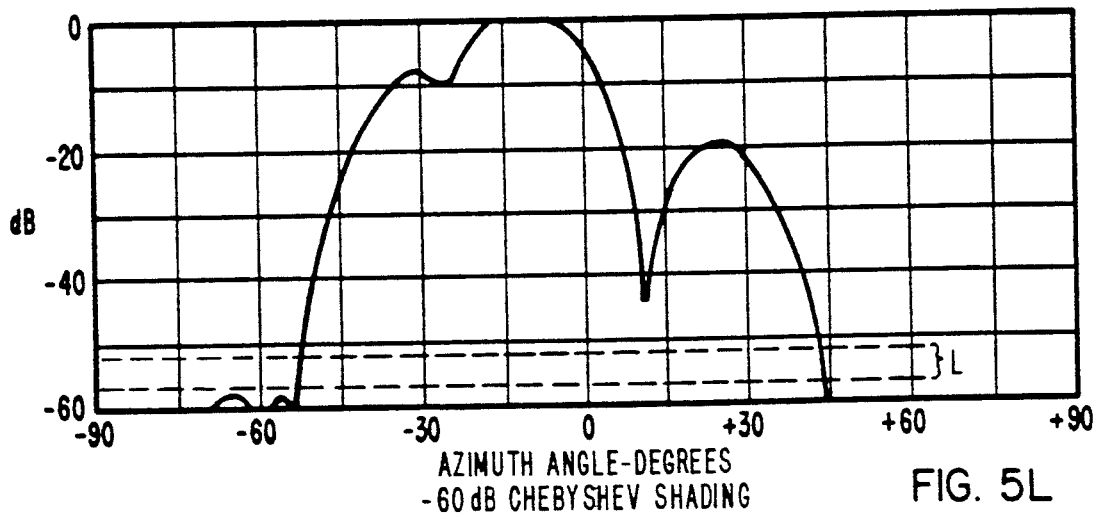
Figure 5M:
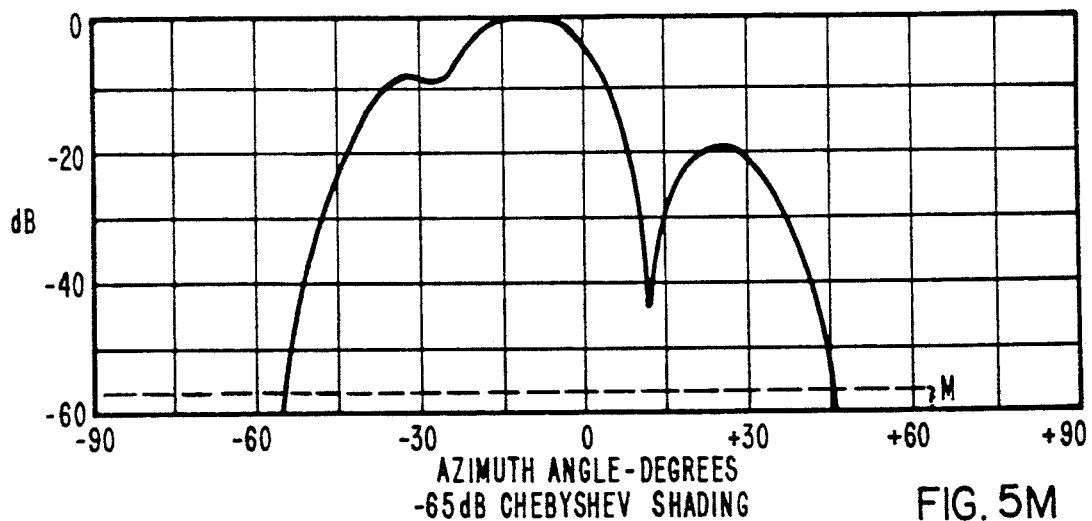

FIG. 5C represents the field pattern obtained with the application of −15 dB Chebyshev shading and data selection circuit 50-3 selects that portion of the curve lying between −7 dB and −12 dB, the portion being indicated by the letter C.

FIGS. 5D-5M indicate the results of progressively moving the side lobe level down, which operation has the effect of severely degrading the resolution on the strong targets. Since the waveform peak at +25 degrees is caused by an actual target, this target shows up in the waveform as the side lobe level is further reduced below −25dB. Data selection circuits 50-4 through 50-13 respectively select the portions of the curves designated D-M with all of the portions A-M being combined, in data combining circuit 60, into one unitary composite field pattern as indicated in FIG. 6. Thus by selecting only the most useful portion of each of the curves and combining them into a composite, all four of the targets are definitely identified by the peaks of the composite waveform at the approximately correct locations and relative amplitudes of the actual targets.

Figure 6:
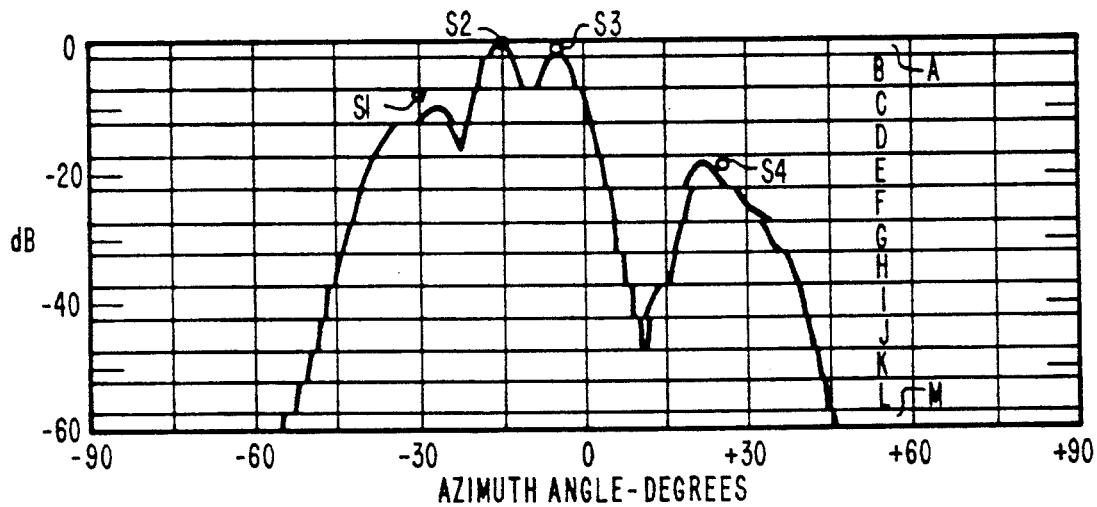

The presentation of FIG. 6 is somewhat disjointed in that the composite pattern includes some gaps as well as some overlaps at various azimuth locations. If a particular azimuth location does not have a value, such as at approximately −54°, −33°, −10°, +27°, by way of example, then data processor 66 (FIG. 3) is operative to assign a value. One simple way of accomplishing this is just to assign the same value of a previous location so that a horizontal line is generated to join the top of one segment to the bottom of a next segment.

If a particular azimuth location has more than one value, such as at approximately −25°, +12°, +18°, +33°, by way of example, then data processor 66 is operative to assign a single value such as by assigning the higher intensity value or by averaging the two.

Figure 6A:
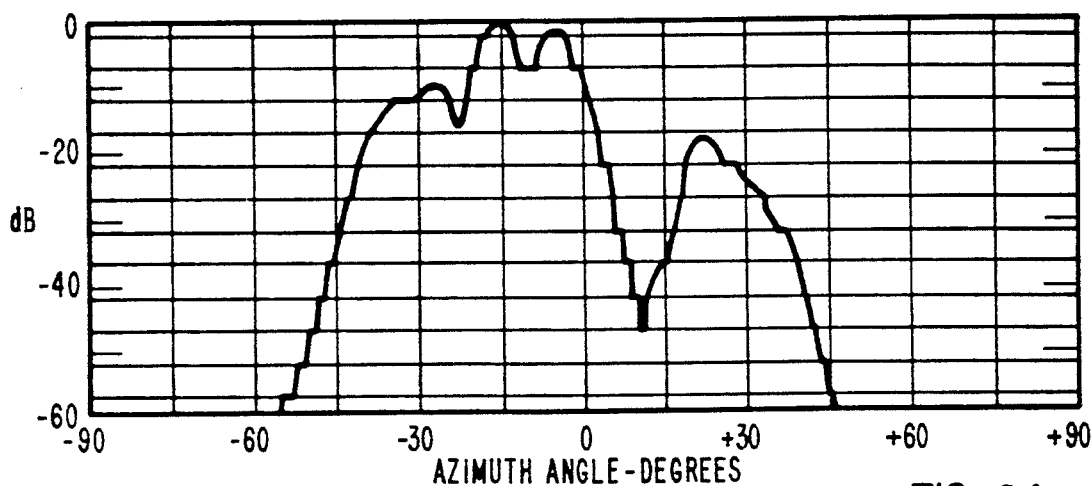

The result of the data processor operation is the continuous curve presentation as depicted in FIG. 6A.

Figure 7:
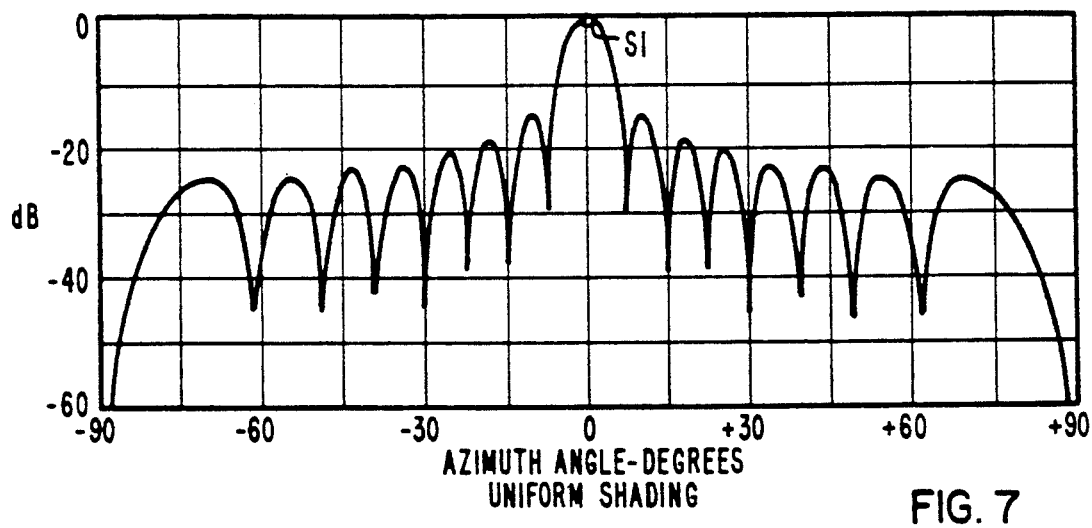
FIG. 7 is a pattern as in FIG. 5 but in response to a single target.
Figure 7A:
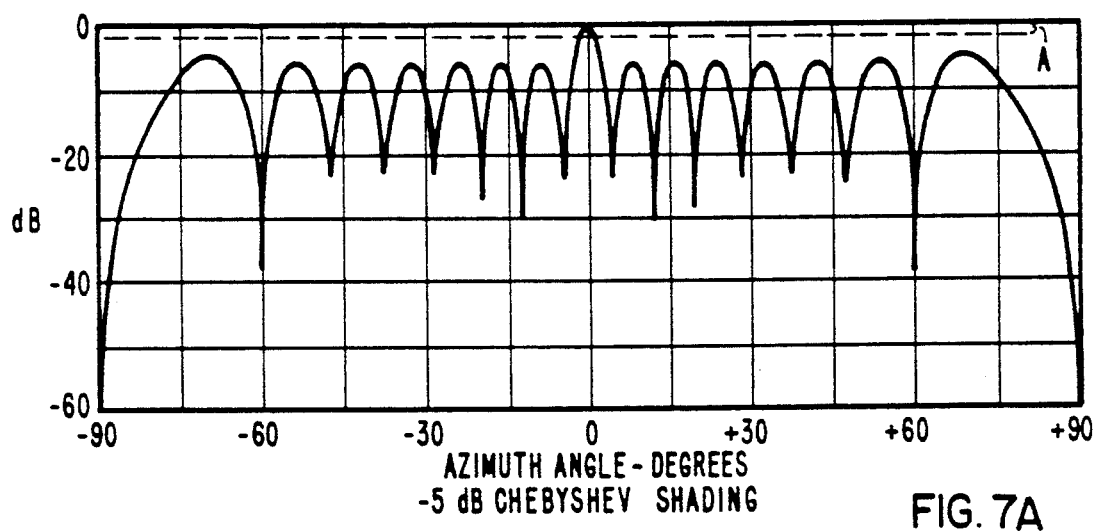
Figure 7B:
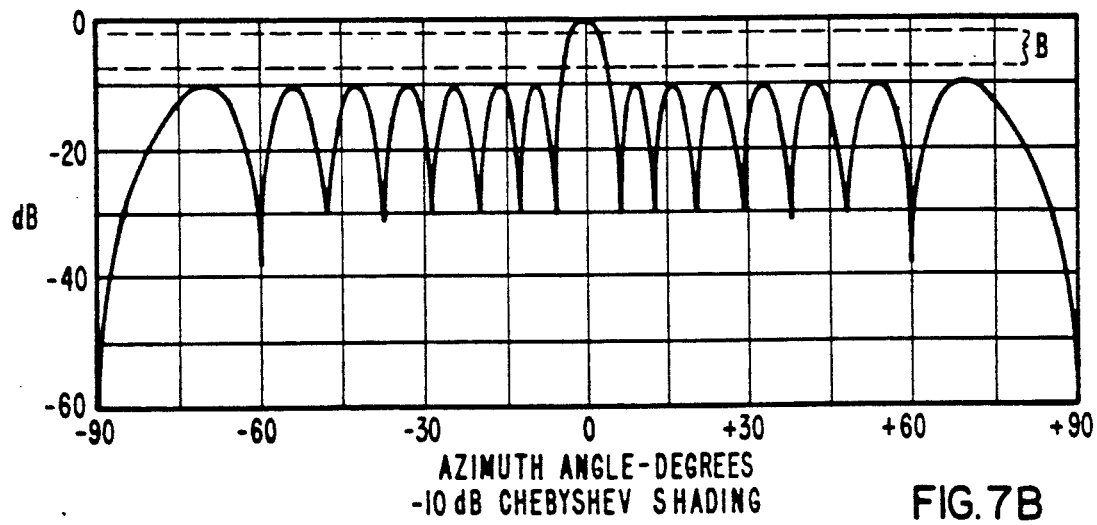
Figure 7I:
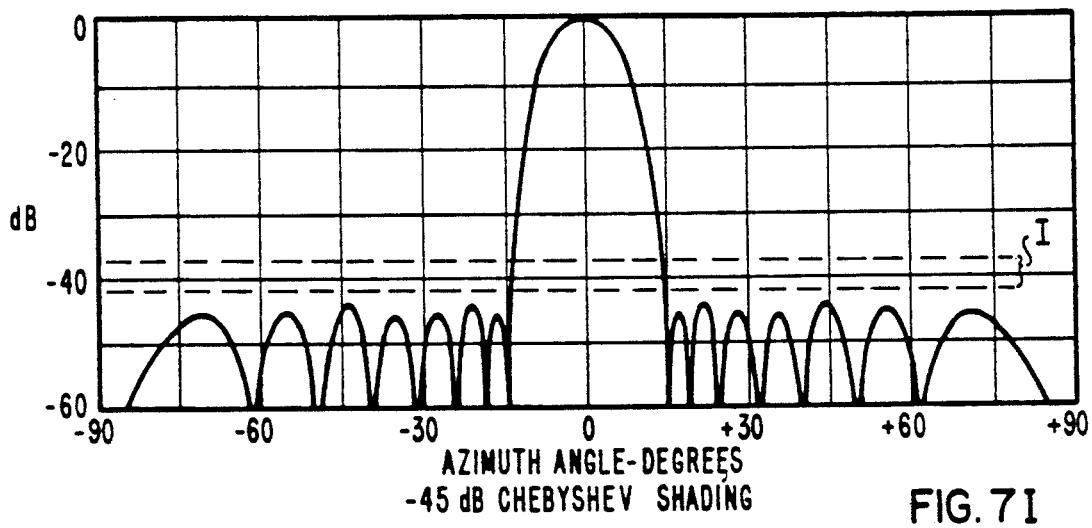
Figure 7J:
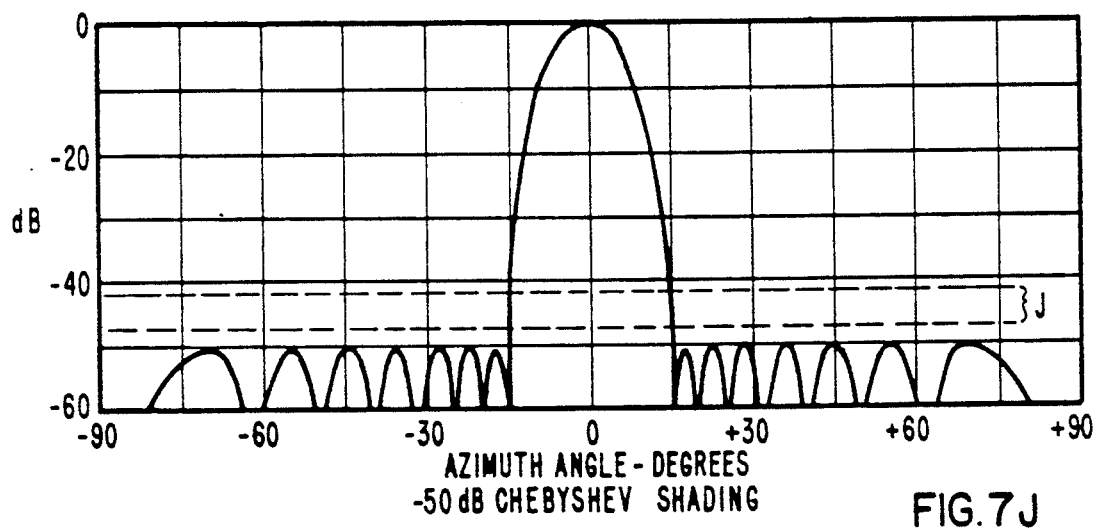
Figure 7K:
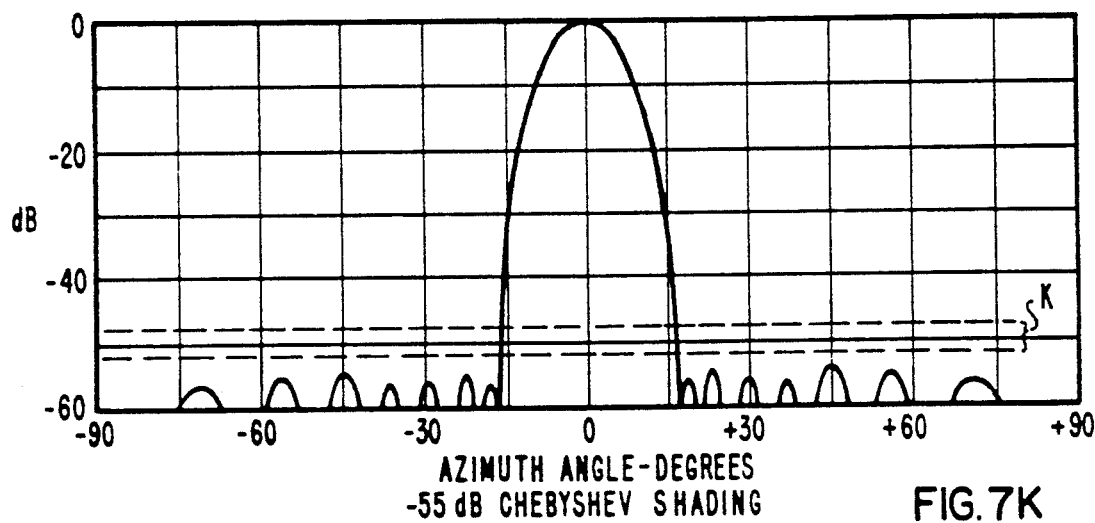
Figure 7L:
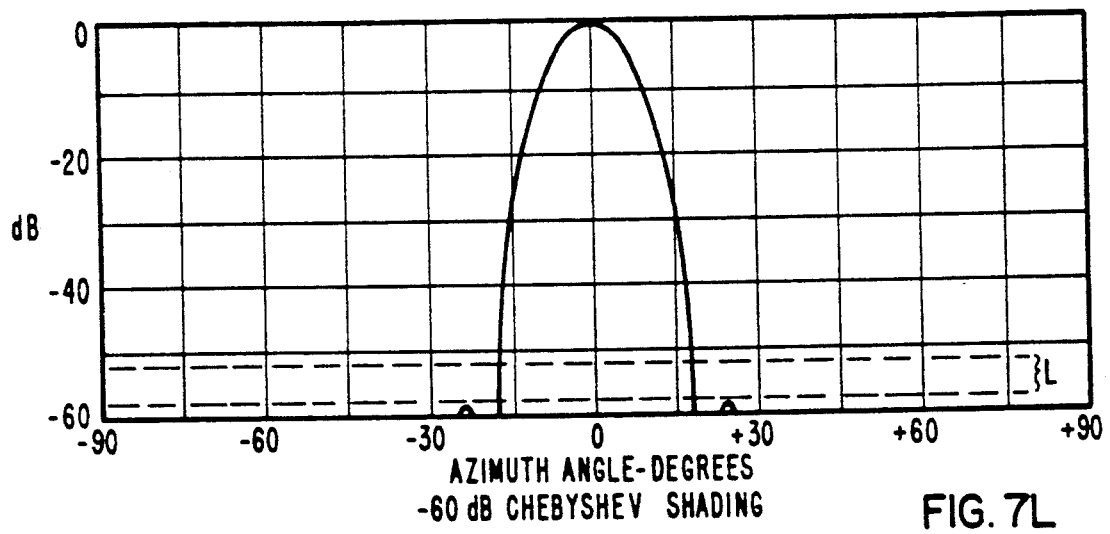
Figure 7M:
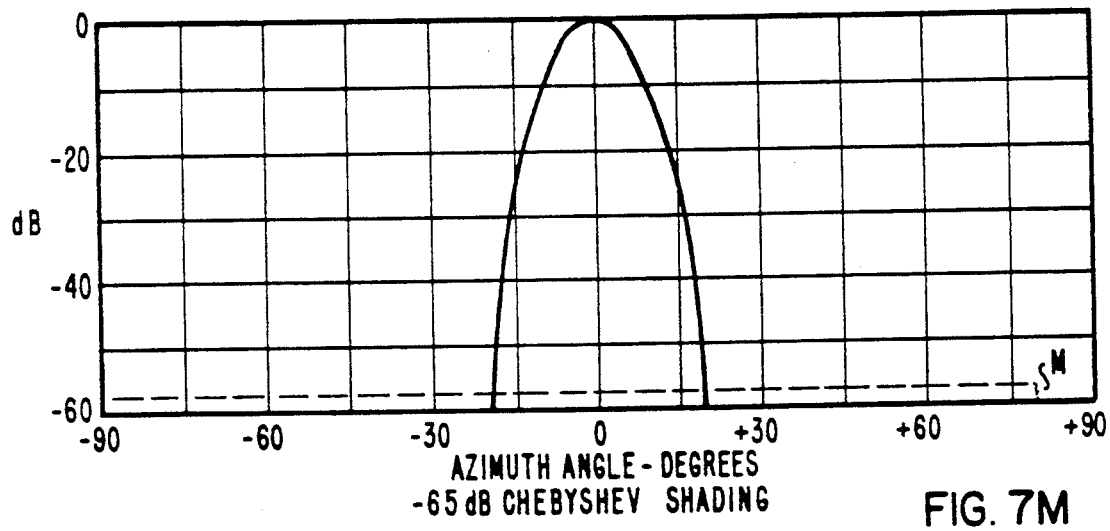
Figure 8:
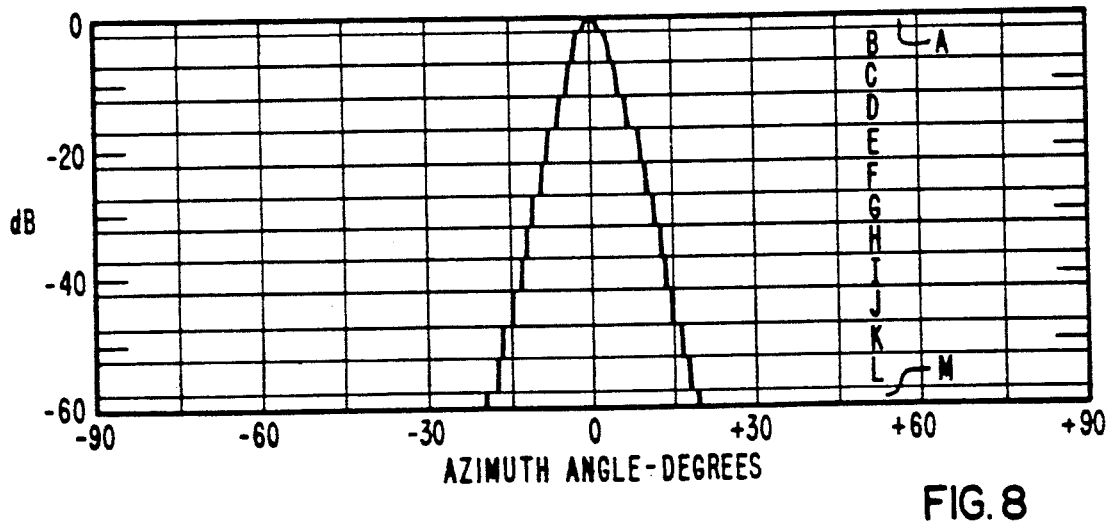
Figure 8A:
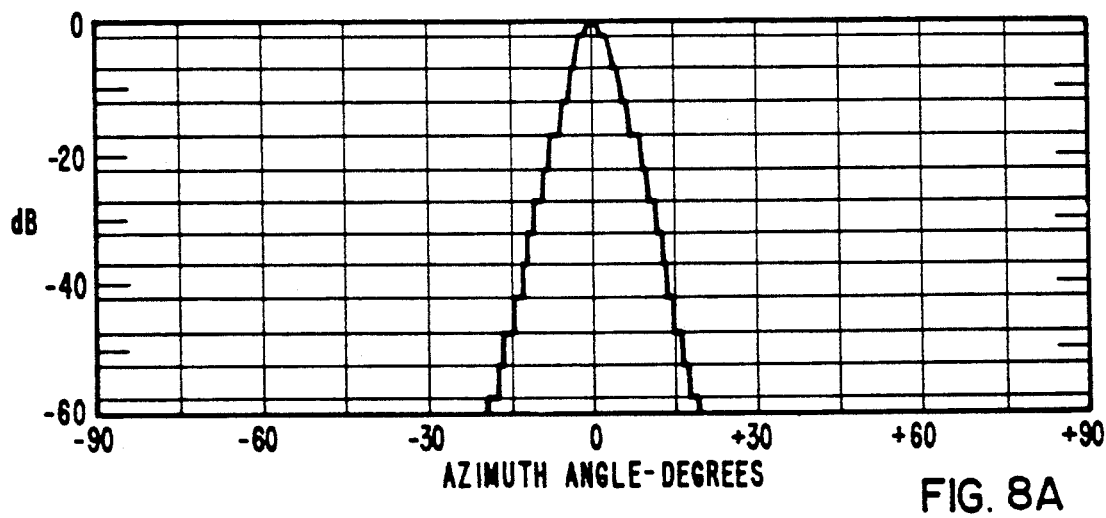

FIG. 7 is another example of a field pattern produced as a result of an unshaded array in the presence of a single target S1 at 0°. Although FIG. 7 illustrates a probable target at 0° it is not known whether or not the side lobes are actually masking weaker targets. The exact same process as described with respect to FIGS. 5A through 6A is carried out for the target situation of FIG. 7 and the results are illustrated in FIGS. 7A through 8A. It is seen in these Figures that as the side lobe level is progressively decreased the main lobe progressively widens. With maximum shading applied, as illustrated in FIG. 7M, it is seen that there are no targets present in the side lobe structure such that the composite waveform, as presented in FIG. 8 or the data processor continuous curve output of FIG. 8A reveals the presence of a target at only the 0° position.

Figure 9A:
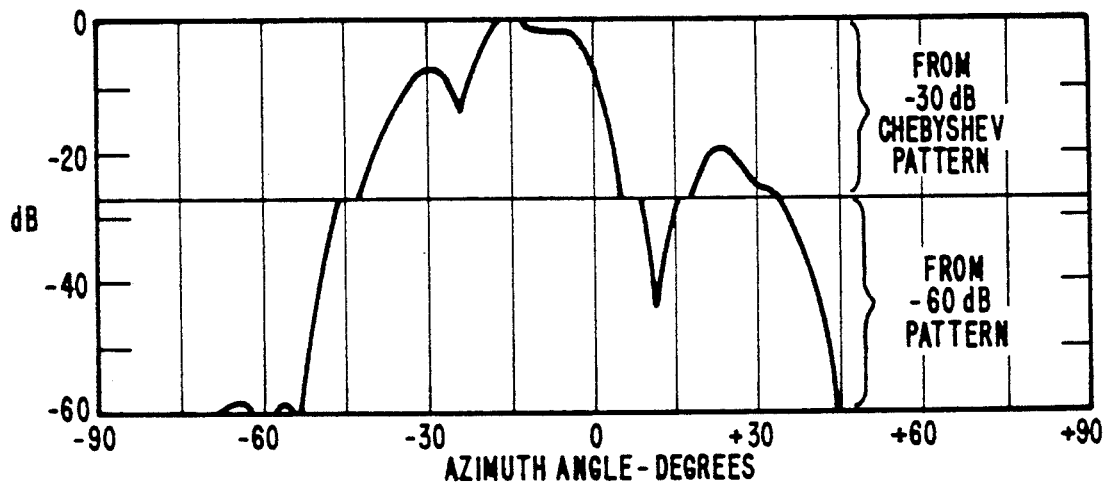
FIGS. 9A-9D are composite field patterns utilizing different multiple levels of shading.
Figure 9B:
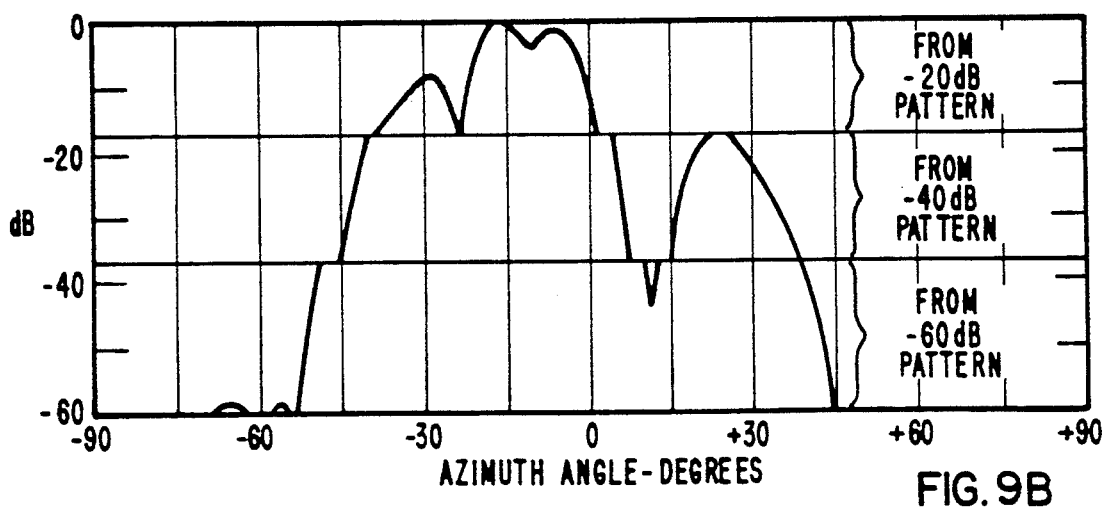
Figure 9C:
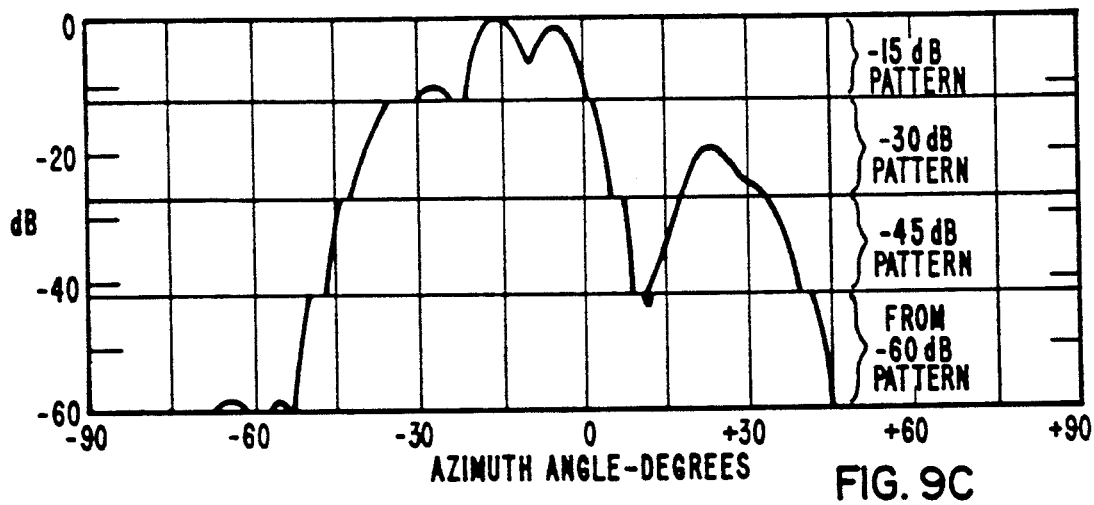
Figure 9D:
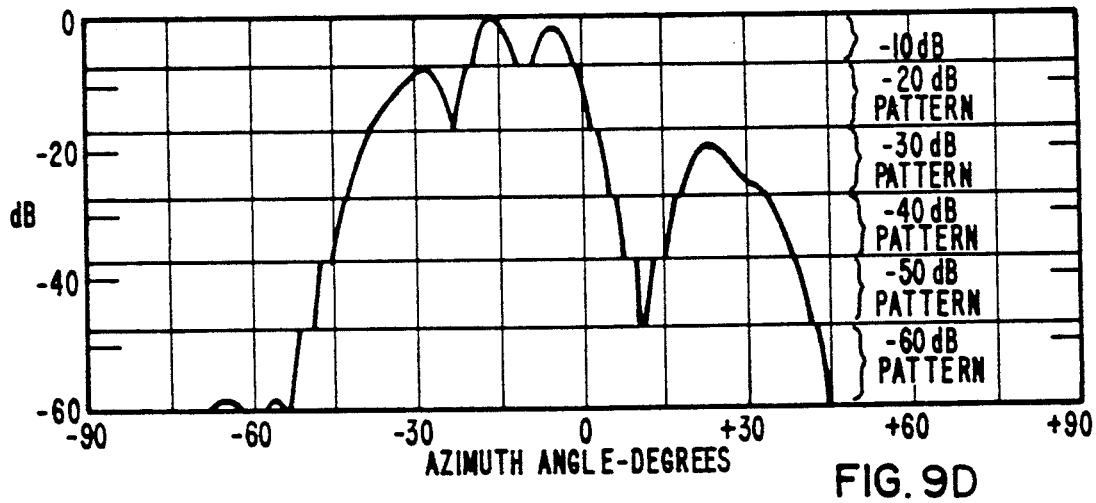

Although the examples presented illustrated the results of thirteen different levels of shading, adequate results may be achieved by using fewer such levels and accordingly fewer computations. For example FIGS. 9A to 9D illustrate the composite patterns resulting from the target situation of FIG. 5 and utilizing two levels of shading, −30dB, and −60dB (FIG. 9A); three levels of shading −20dB, −40dB, and −60dB (FIG. 9B); four levels of shading, −15dB, −30dB, −45dB and −60dB (FIG. 9C); and six levels of shading, −10dB, −20dB, −30dB, −40dB, −50dB, −60dB (FIG. 9D).

Figure 10:
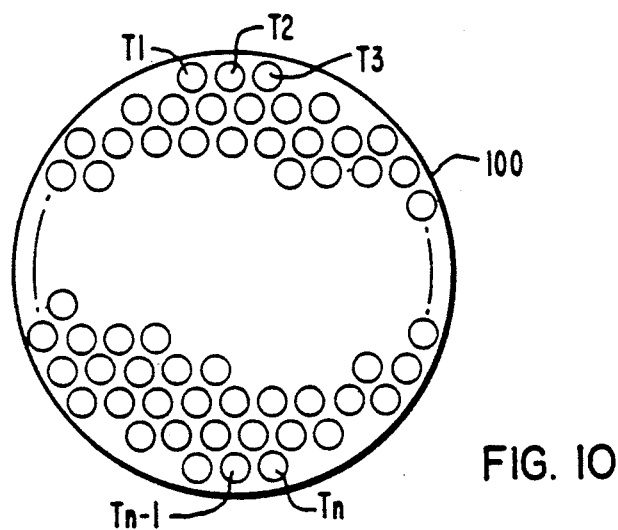
FIG. 10 is a view of a round array of transducer elements.

When there is a known noise level, there is nothing to be learned by generating patterns with side lobes that are substantially below this level. In addition to a line array, as described, the apparatus is equally applicable to multi-dimensional arrays one of which is illustrated by way of example in FIG. 10. Array 100 of FIG. 10 is circular in nature and is comprised of a plurality of transducer elements T1 to Tn. A typical field pattern as would be produced by a single target and without any shading, would appear similar to that illustrated in FIG. 11.

Figure 11:
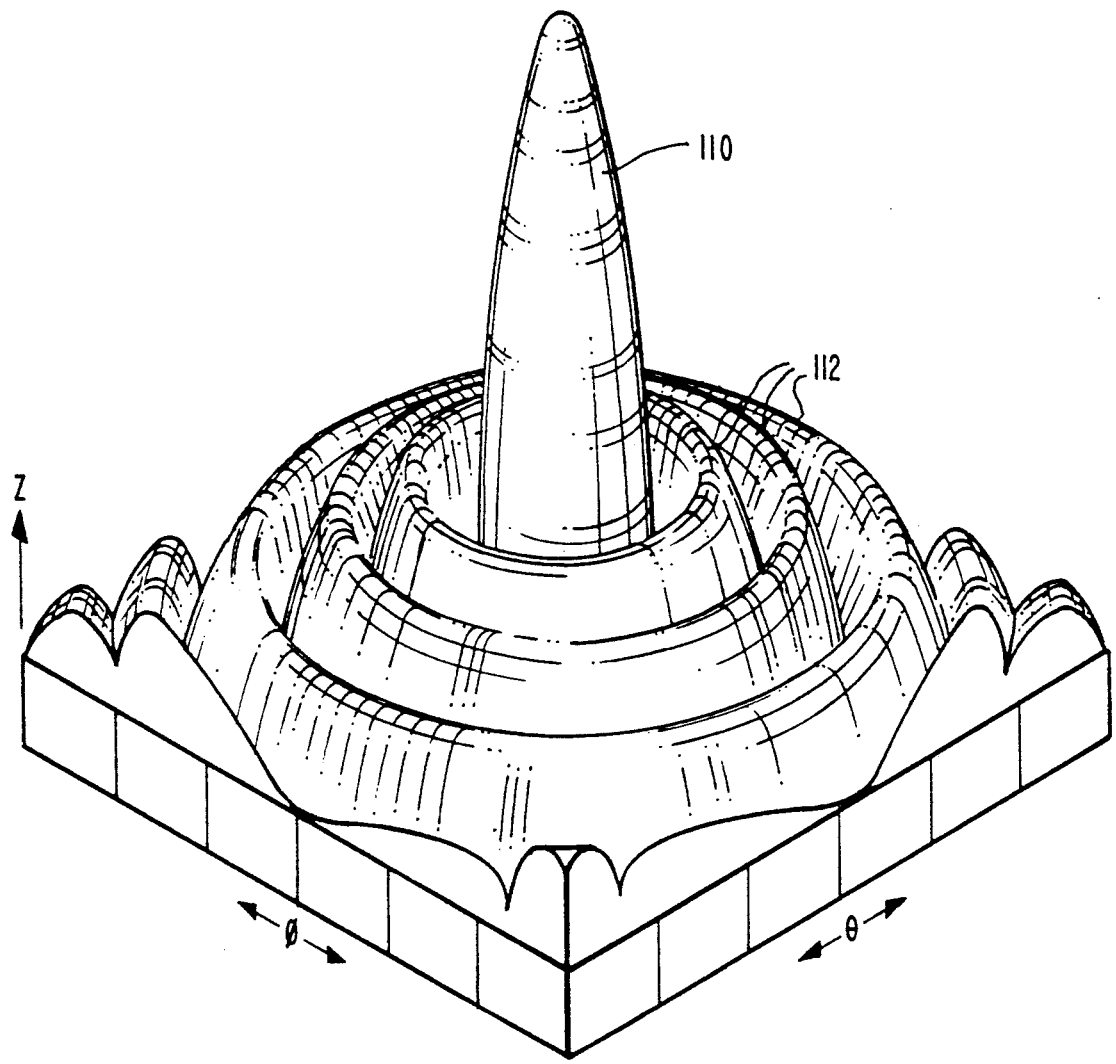
FIG. 11 is an isometric pattern produced by the round array of FIG. 10, in response to a single target.
Figure 12:
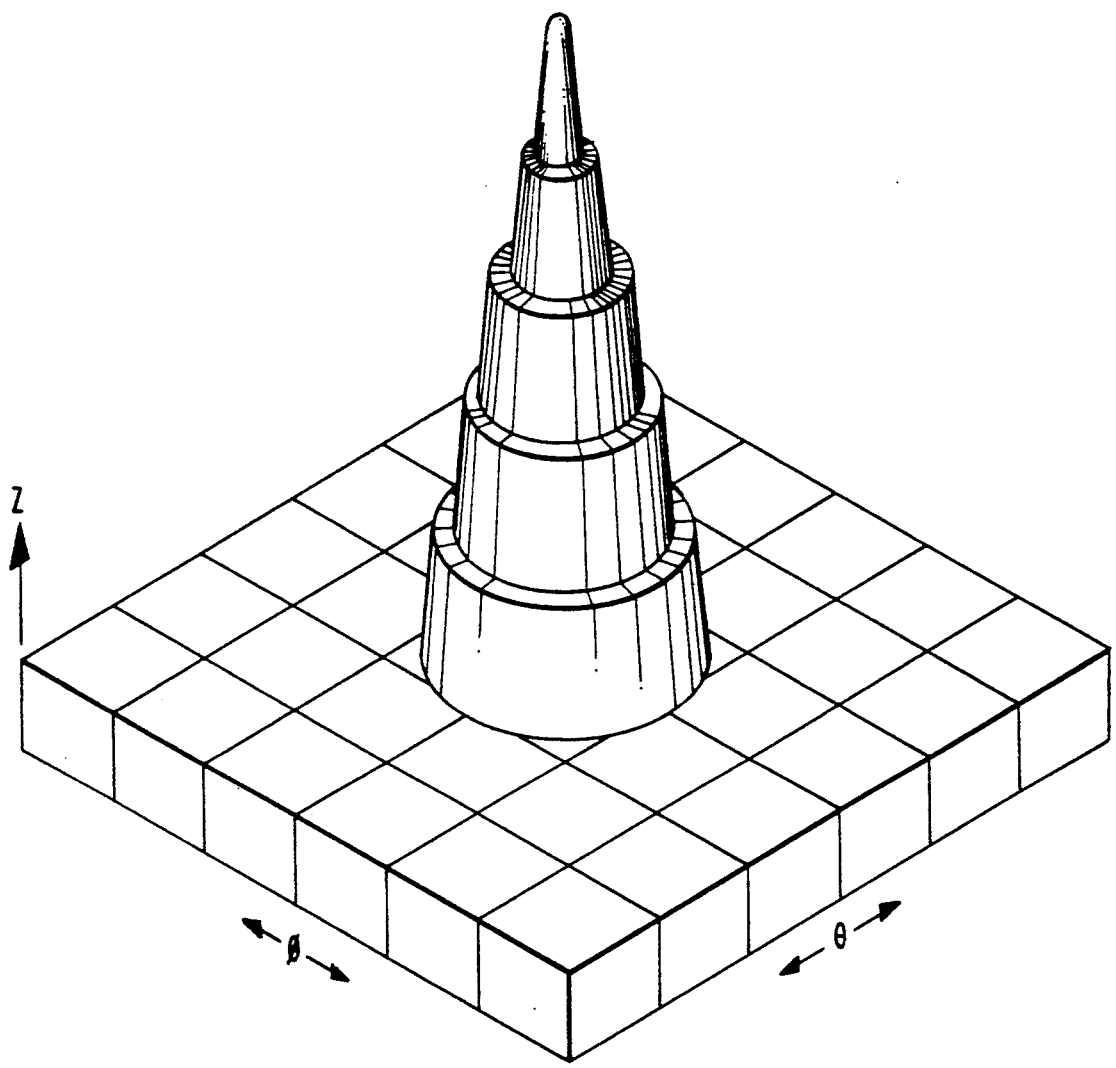
FIG. 12 is a composite field pattern resulting from operation of the present invention.

The pattern of FIG. 11 is of the type which is conventionally generated by a computer controlled display which presents azimuth $\theta$ on one axis, elevation $\phi$ on another axis and intensity on the z axis. The presentation is typical of a sonar system which calculates acoustic intensity at a multiplicity of points $(\theta,\phi)$ which the display computer converts into a grid like presentation. (For ease of presentation the actual numerous grid lines have not been illustrated). It is seen that a single target will generate a main lobe 110 and a plurality of side lobes 112 which may or may not be masking a weak target. In accordance with the present invention, such as presented in FIG. 3, different levels of shading are applied to the transducer outputs of the array so as to raise the level of the side lobes 112 and decrease the width of the main lobe 110, and vice versa. A segment of each generated field pattern is stored and thereafter combined to result in a display such as illustrated in FIG. 12 showing the results of combining the different data from five different levels of shading function. The presentation demonstrates that a single target was in the field of view and that no weak targets were masked by side lobe levels.

Figure 13:
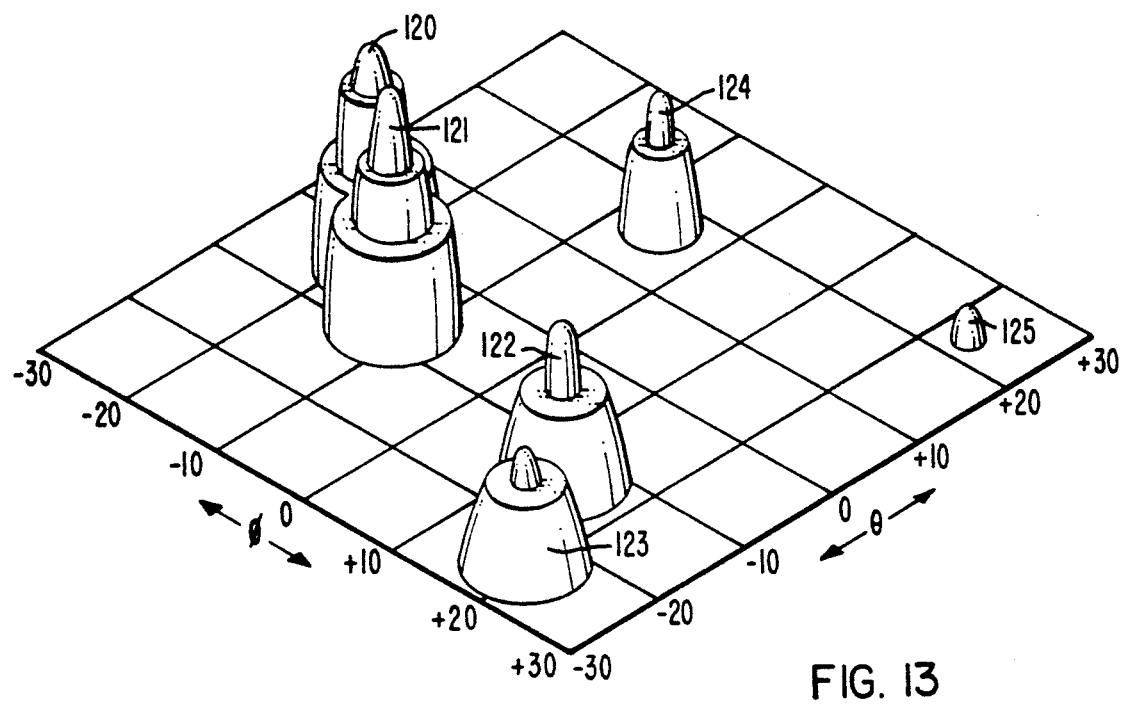
FIG. 13 is a composite display generated in response to multiple targets.

FIG. 13 illustrates a resultant display wherein the signal processing was performed by utilizing three different levels of shading, and wherein six different targets are detected and represented by patterns 120 to 125. In a presentation without the use of the present invention an operator would have detected the presence of a target at the location of pattern 121 and perhaps 120, with questionable targets at the location of patterns 122 and 124. In all probability the target at the location of pattern 123 would have been lost in the side lobe level and the target at the location of pattern 125 would have been completely lost in the side lobe levels.

If the pattern had been generated with a single strong shading level (e.g. −50dB Chebyshev) then the weak target as represented by pattern 125 would have been visible, however, the two adjacent patterns 120 and 121 (and perhaps 122 and 123) would have blended into a single target because of the resulting loss of resolution.

Figure 14:
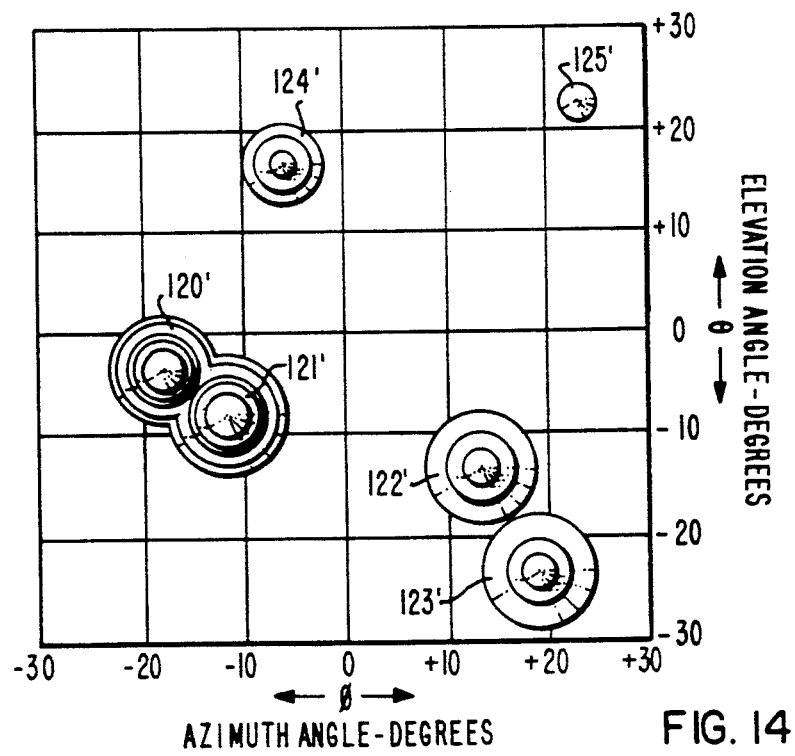
FIG. 14 is an alternate type of display.

Once having the information stored relative to the intensity at particular $\theta$, $\phi$ points, various other types of displays are possible. For example, different intensity segments of the composite field pattern may be displayed in respectively different colors on a color CRT. Additionally, and as illustrated in FIG. 14, a two-dimensional display of $\theta$ and $\phi$ may be made where intensity is represented by various gradations of intensity on a black and white screen or by various colors on a color CRT. The various bullseye-like target presentations 120′ to 125′ in FIG. 14 correspond to the targets designated by patterns 120 to 125 of FIG. 13.

A system using a downward looking sonar on a moving vehicle can generate displays such as illustrated in FIGS. 13 and 14 by using the information that is obtained- as it moves forward. In such instance, the $\theta$ and $\phi$ coordinates would be replaced by X and Y coordinates, where Y would be distance along the travel path and X, the distance at right angles to the travel path.

Although examples have been given of a straight line array and a flat circular array it is to be understood that the invention may be used with curved line arrays as well as conformal arrays. Further, for ease of understanding, the different levels of shading and the subsequent signal processing presented in FIG. 3 have been illustrated as parallel channels of signal processing. With modern day computer technology, the shading, normalization, data selection, combining and smoothing may be performed sequentially by a single digital computer. Additionally, the signal processing described with respect to a sonar system is also applicable to an array of elements which may be utilized in a radar system for target detection.

What we claim is:
1. A detection system, comprising:
   A) an array of transducer elements, each operable to provide an output signal in response to energy received from a target area under observation;
   B) means including beamformer means operable in response to all of said output signals of said transducer elements to apply different levels of shading function thereto to derive a plurality of different field pattern signals; and
   C) means for selecting different predetermined portions from said plurality of field pattern signals and combining said predetermined portions into a single unitary composite field pattern signal.
2. Apparatus according to claim 1 wherein:
   A) said array is a line array.
3. Apparatus according to claim 1 wherein:
   A) said array is a multi-dimensional array.
4. Apparatus according to claim 1 wherein:
   A) said transducer elements are sonar transducer elements each operable to provide an output signal in response to received acoustic energy.
5. Apparatus according to claim 4 which includes:
   A) acoustic projector means for transmitting acoustic energy toward said target area under investigation.
6. Apparatus according to claim 1 wherein:
   A) said beamformer means is comprised of a plurality of individual beamformer sections simultaneously operable to apply said different levels of shading function.
7. Apparatus according to claim 1 wherein:
   A) said beamformer means is a digital beamformer means; and which includes
   B) analog-to-digital converter means coupled to said transducer elements to convert the analog signals therefrom into respective digital signals.
8. Apparatus according to claim 1 wherein:
   A) different levels of the same shading function are applied to said output signals.
9. Apparatus according to claim 1 which includes:
   A) means for displaying said unitary composite field pattern signal.
10. Apparatus according to claim 9 wherein:
    A) said array is a line array; and
    B) said display presents signal intensity on one axis and azimuth angle on a second axis perpendicular to said one axis.
11. Apparatus according to claim 9 wherein:
    A) said array is a multi-dimensional array; and
    B) said display respectively presents on three mutually perpendicular axes, signal intensity, a first direction and a second direction.
12. Apparatus according to claim 9 which includes:
    A) signal processor means responsive to said means for selecting and operable to join lines of adjacent selected portions to provide a continuous curve presentation on said means for displaying.

* * * * *